(12) United States Patent
Fornai et al.

(10) Patent No.: US 6,843,835 B2
(45) Date of Patent: Jan. 18, 2005

(54) AIR CLEANING APPARATUS AND METHOD FOR CLEANING AIR

(75) Inventors: Daniele Fornai, Granaglione (IT); Stylianos Kouvroukoglou, Rome (IT); Patrizio Ricci, Grimbergen (BE); Renzo Rizzo, Cincinnati, OH (US); Sergio Rossi, Ferrara (IT); Andrea Filippo Argentieri, Brussels (BE); Stefano Scialla, Rome (IT)

(73) Assignee: The Procter & Gamble Company, Cincinnati, OH (US)

(*) Notice: Subject to any disclaimer, the term of this patent is extended or adjusted under 35 U.S.C. 154(b) by 48 days.

(21) Appl. No.: 10/106,917

(22) Filed: Mar. 25, 2002

(65) Prior Publication Data

US 2003/0056648 A1 Mar. 27, 2003

Related U.S. Application Data

(60) Provisional application No. 60/279,191, filed on Mar. 27, 2001.

(51) Int. Cl.[7] ............................................... B03C 3/013
(52) U.S. Cl. ..................... 96/53; 96/57; 96/74; 96/234; 96/235; 96/240; 96/242; 96/263; 96/264; 96/351; 261/63; 261/117; 261/121.1
(58) Field of Search ............................... 96/52, 53, 57, 96/74, 234, 235, 240, 242, 263, 264, 353, 351; 261/63, DIG. 9, 115, 117, 121.1, 124

(56) References Cited

U.S. PATENT DOCUMENTS

| | | | | |
|---|---|---|---|---|
| 2,273,194 A | * | 2/1942 | Hedberg et al. | 96/53 |
| 3,299,620 A | | 1/1967 | Hollingworth | 96/53 |
| 3,334,471 A | * | 8/1967 | Herron | 96/264 |
| 3,340,680 A | * | 9/1967 | Fields et al. | 95/36 |
| 3,385,654 A | * | 5/1968 | Yardney et al. | 422/4 |

(List continued on next page.)

FOREIGN PATENT DOCUMENTS

| | | |
|---|---|---|
| CN | 1224033 A | 7/1999 |
| DE | 2 205 600 | 8/1973 |
| DE | 32 24 350 A1 | 1/1984 |
| DE | 34 23 744 A1 | 1/1986 |
| DE | 34 38 141 A1 | 4/1986 |
| DE | 198 32 237 A1 | 2/2000 |
| EP | 0253 563 B1 | 1/1990 |
| EP | 0 766 050 A2 | 4/1997 |
| EP | 0 628 341 B1 | 1/2000 |
| EP | 0 974 388 B1 | 8/2001 |
| FR | 2 758 612 A1 | 7/1998 |
| JP | 55152590 A2 | 11/1980 |

(List continued on next page.)

OTHER PUBLICATIONS

Tsair–Wang Chung, Tushar K. Ghosh, Anthony L. Hines, and Davor Novosel; Dehumidification of Moist Air With Simultaneous Removal of Selected Indoor Pollutants by Triethylene Glycol Solutions in a Packed–Bed Absorber, Separation Science and Technology, 1995, vol. 30, pp. 1807–1832.

Author Unknown, Venta–Airwsher Air Purifier/Humidifer, date unknown (but may be prior to filing date of application), Best Vacuum, Inc., Chicago, Illinois.

Primary Examiner—Richard L. Chiesa
(74) Attorney, Agent, or Firm—Jeffrey W. Bamber

(57) ABSTRACT

An air cleaning apparatus is disclosed which, in one embodiment, has: an inlet for ambient air; an outlet for purified air; a mechanism for the uptake of a scrubbing liquor and for the removal of impurities dissolved or dispersed in the ambient air by contact with said scrubbing liquor; an inlet for feeding a scrubbing liquor from a scrubbing liquor feeding tank; an outlet for discharging used scrubbing liquor; and a blower for drawing ambient air into the apparatus, flowing the air through the apparatus and discharging the purified air from the apparatus. A kit including an apparatus as described above and a refill of scrubbing liquor ingredients, or of a scrubbing liquor concentrate or of a ready-to-use scrubbing liquor is also disclosed.

28 Claims, 5 Drawing Sheets

U.S. PATENT DOCUMENTS

| | | | | |
|---|---|---|---|---|
| 3,433,578 | A | * 3/1969 | Reid | 422/4 |
| 3,633,340 | A | 1/1972 | Hollingworth | 95/154 |
| 3,668,833 | A | * 6/1972 | Cahill, Jr. | 96/53 |
| 3,907,525 | A | * 9/1975 | King | 96/53 |
| 3,958,958 | A | 5/1976 | Klugman et al. | 95/64 |
| 4,035,451 | A | * 7/1977 | Tringali | 261/101 |
| 4,057,602 | A | * 11/1977 | Kolm | 261/63 |
| 4,257,783 | A | * 3/1981 | Gutjahr et al. | 96/240 |
| 4,265,642 | A | 5/1981 | Mir et al. | 95/154 |
| 4,305,909 | A | * 12/1981 | Willett et al. | 96/53 |
| 4,468,372 | A | * 8/1984 | Seifert et al. | 96/52 |
| 4,473,380 | A | * 9/1984 | Voliva et al. | 96/53 |
| 4,705,621 | A | 11/1987 | Penick | 208/146 |
| 4,853,010 | A | 8/1989 | Spence, deceased et al. | 96/52 |
| 4,863,495 | A | 9/1989 | Rafson | 95/206 |
| 5,004,486 | A | * 4/1991 | Chen | 261/DIG. 9 |
| 5,084,072 | A | * 1/1992 | Reynolds | 96/52 |
| 5,084,078 | A | * 1/1992 | Suzuki et al. | 96/52 |
| 5,122,165 | A | 6/1992 | Wang et al. | 95/92 |
| 5,154,734 | A | * 10/1992 | Yung | 96/53 |
| 5,250,267 | A | 10/1993 | Johnson et al. | 422/168 |
| 5,310,416 | A | * 5/1994 | Borger et al. | 96/52 |
| 5,389,120 | A | 2/1995 | Sewell et al. | 96/233 |
| 5,427,608 | A | * 6/1995 | Auer et al. | 96/53 |
| 5,531,800 | A | 7/1996 | Sewell et al. | 96/240 |
| 5,531,801 | A | 7/1996 | Sewell et al. | 96/240 |
| 5,599,508 | A | * 2/1997 | Martinelli et al. | 96/53 |
| 5,643,421 | A | 7/1997 | Smith | 203/12 |
| 5,645,807 | A | 7/1997 | College et al. | 423/243.1 |
| 5,690,898 | A | * 11/1997 | Barnes et al. | 96/53 |
| 5,902,380 | A | * 5/1999 | Tomimatsu et al. | 96/74 |
| 6,110,256 | A | * 8/2000 | Reynolds et al. | 96/74 |
| 6,391,093 | B1 | * 5/2002 | French et al. | 96/353 |
| 6,500,240 | B1 | * 12/2002 | Tomimatsu et al. | 96/53 |
| 2003/0056648 | A1 | 3/2003 | Fornai et al. | 95/65 |

FOREIGN PATENT DOCUMENTS

| | | |
|---|---|---|
| JP | 57084718 A2 | 5/1982 |
| JP | 57167717 A2 | 10/1982 |
| JP | 61-222521 | 10/1986 |
| JP | 63-92351 | 4/1988 |
| JP | 04-075659 | 3/1992 |
| JP | 0606355 A | 3/1994 |
| JP | 08089750 A | 4/1996 |
| JP | 96229340 | 9/1996 |
| JP | 10-99685 | 4/1998 |
| JP | 11-104433 | 4/1999 |
| JP | 11-335117 | 12/1999 |
| JP | 2000-39235 | 2/2000 |
| JP | 2000-70659 A | 3/2000 |
| JP | 2000-140557 | 5/2000 |
| JP | 00279756 A | 10/2000 |
| WO | WO 92/19364 | 11/1992 |
| WO | WO 93/00147 | 1/1993 |
| WO | WO 96/15845 | 5/1996 |
| WO | WO 97/18029 | 5/1997 |
| WO | WO 97/27831 | 8/1997 |
| WO | WO 99/12853 A1 | 3/1999 |
| WO | WO 00/66247 | 11/2000 |

* cited by examiner

AIR CLEANING APPARATUS AND METHOD FOR CLEANING AIR

This application claims the benefit of the filing date of U.S. Provisional Patent Application Ser. No. 60/279,191 filed on Mar. 27, 2001.

FIELD OF THE INVENTION

The present invention relates to an air cleaning apparatus and method for purifying ambient air, especially air within a confined space such as indoors, or in a vehicle. The device and method may be used in a single room, or on a bigger scale for apartments and houses, or commercial settings like office buildings, hotels, hospitals, restaurants, shops, galleries, cinemas, theatres, convention centers, day care centers and schools or transport means such as cars, buses, coaches, trains, planes, ships, ferries, cruisers.

BACKGROUND OF THE INVENTION

Concerns around indoor air quality are growing among consumers and in the scientific/medical community. People are increasingly aware that indoor air pollution can be responsible both for short-term health effects such as eye irritation, headache, breathing problems, allergies, and for serious diseases like chronic respiratory syndromes.

There are numerous air cleaning devices on the market, most of them based on mechanical or electrostatic filters and/or negative ions production (ionizers). While they achieve a good removal of particulate air contaminants, they often fail to be effective on very small particles of the submicron range. Further, they are quite inefficient against bacteria and viruses, and especially vapor/gaseous contaminants like sulfur or nitrogen oxides, VOC's (Volatile Organic Compounds) and numerous species of radicals present in an indoor environment. In particular VOC's have a large impact on health and are responsible for odors, so that their removal is highly relevant to consumers. Lately, it has also been observed and reported that exposure to VOC's and other gaseous pollutants such as Nitrogen oxides can result in allergies or worsening of asthma conditions.

Further, while mechanical filters work in laboratory conditions, they soon get loaded with the filtered impurities and lose their effectiveness in real life conditions. Electrostatic filters, on the other hand, while suffering less from this drawback, present the problem that the charged surfaces must be effectively and frequently cleaned from the collected impurities while requiring special care to avoid re-emitting the impurities into the air. Filters impregnated with active materials that chemically interact with air contaminants are also available, but their limitation is similar to mechanical filters in that the impregnation gets soon exhausted or dries up, thus restricting the effective duration of the filter and requiring a frequent exchange.

DE-A-2 205 600 describes an indoor air cleaning apparatus wherein a slowly revolving drum is partially immersed in an aqueous agent solution and polluted air flows through the non-immersed portion of the drum. The kind and the nature of the agent to be used in this apparatus is not described at all, except that it is available in powder form and to be dissolved in water. In addition, that type of apparatus does not control the outlet air relative humidity, increasing the indoor air relative humidity during normal operation.

One of the problems one embodiment of the present invention addresses is to provide a stand alone and/or portable indoor air cleaning apparatus which is simple in construction and allows the efficient removal of dissolved or dispersed contaminants, in particular VOC's and other gaseous pollutants.

SUMMARY OF THE INVENTION

In one non-limiting embodiment, the present invention provides a portable indoor air cleaning apparatus comprising:

an inlet for ambient air;

an outlet for purified air;

a means for the uptake of a scrubbing liquor and for the removal of impurities dissolved or dispersed in the ambient air by contact with said scrubbing liquor;

an inlet for feeding a scrubbing liquor from a scrubbing liquor feeding tank or any type of liquid containing cartridge;

an outlet for discharging used scrubbing liquor; and a blower for drawing ambient air into the apparatus, flowing the air through the apparatus and discharging the purified air from the apparatus, and optionally a means for removal of liquid and/or solid suspended particles.

The present invention also provides a kit comprising an apparatus as described above and a refill of scrubbing liquor ingredients, or of a scrubbing liquor concentrate, or of a ready-to-use scrubbing liquor, possibly with an appropriate ready-to-use filter application either for the scrubbing liquor or for the inlet or outlet air.

The present invention, in one non-limiting aspect, also provides a method for cleaning air comprising contacting the air with a liquid, preferably a non-evaporative liquid, which contains active solid particles.

BRIEF DESCRIPTION OF THE DRAWINGS

While the specification concludes with claims particularly pointing out and distinctly claiming the present invention, it is believed the invention will be better understood from the following description taken in conjunction with the accompanying drawing(s).

DETAILED DESCRIPTION OF THE INVENTION

The Cleaning Apparatus

The preferred device used in the present invention is any type of device that helps contact air with the scrubbing liquor. Specifically suitable for this purpose are Venturi scrubbers (that bring air & liquid in contact via the venturi effect), dynamic scrubbers (that bring air & liquid in contact via curtain of liquid in mist & fine blow of air), spray scrubbers (that bring air & liquid in contact by spraying fine mist or droplets of liquid onto air), rotary scrubbers (that bring liquid form center of a rotating fan at high shear and mix in the fan casing), bubbling scrubbers (in which the air pass through a liquid reservoir creating fine bubbles that contact the liquid itself), packed column scrubbers (that bring air & liquid in contact via solid material filling of the column), fluidized bed scrubbers (in which the column filling material is not packed but it is moved by the liquid flow passing through it), revolving drum scrubber (in which the liquid and air are brought into contact via several paddle drums that rotates inside the scrubbing liquor, wetting all their surface).

For the present invention, the most preferable scrubber application is a packed column scrubber such as a single or multi-stage packed scrubber. The packing materials types suitable for use in the present invention are random packings (Rashig rings, pall rings, any other rings, marble glass, plastic spheres or cylinders, metallic foam, and any thing with high surface) or structured packing (shaped metal or plastic sheet, such as Mellapak material manufactured by Sulzer).

Figure 1:
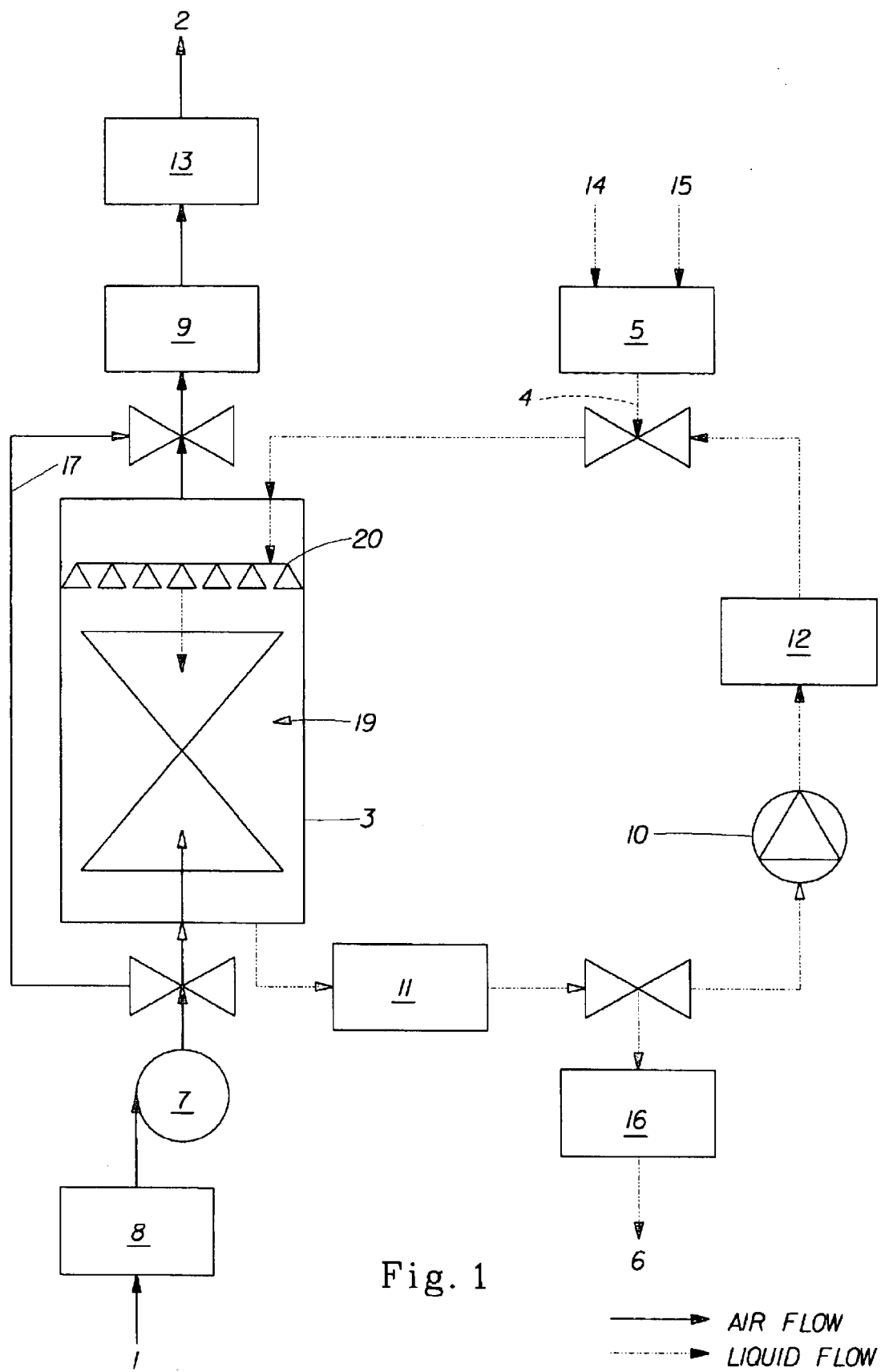
FIG. 1 is a flow diagram of one non-limiting embodiment of the apparatus and method of the present invention.

The apparatus of the present invention can be more readily appreciated by reference to FIG. 1 which depicts in general terms a schematic drawing of one non-limiting embodiment of the invention. Referring now to FIG. 1, the apparatus comprises an inlet 1 for ambient air, an outlet 2 for purified air, a cleaning core, which in the present example is a packed column scrubber 3, which generates via the distributor 20 a spray of fine droplets of scrubbing liquor from the top of the scrubber and within which the ambient air enters from the lower part, and which is filled with a media of suitably designed fillers or porous elements in the area designated 19 where a counter-current contact between the air and the liquor scrubbing liquor is created in order to remove impurities dissolved or dispersed in the ambient air, an inlet 4 for feeding a scrubbing liquor from a feeding tank 5, an outlet 6 for discharging used scrubbing liquor, and a blower 7 for drawing ambient air into the apparatus, flowing the air through the apparatus and discharging the purified air out of the apparatus. The scrubber can further comprise a demister, not shown on the drawing, in order to retain part of or the whole of liquid droplets which may eventually be generated under normal operating conditions of the packed column. Further provided is a mechanical inlet filter 8 to eliminate larger particles, e.g. above 10–100 µm, contained in the ambient air, and an outlet filter 9, which under the present example is an electrostatic precipitator device to eliminate remaining suspended solid and liquid particles down to the sub-micron size from the purified air. Further, the apparatus comprises a pump 10 for circulating the scrubbing liquor through the scrubber 3. Within the recirculation line, there is provided a UV-chamber 11, in order to irradiate the scrubbing liquor during its recirculation, thereby catalyzing the destruction of organic and biological contaminants by peroxides or photobleaching agents contained in the scrubbing liquor. The recirculation line also comprises a replaceable mechanical filter 12 to eliminate the trapped airborne particulate matter from the scrubbing liquor before it is recirculated to the scrubber 3. Further provided is an emitter 13 of negative ions (ionizer) followed by an ozone trapping permanent or temporary filter of suitable material. To determine the exhaustion degree of the scrubbing liquor, there may be provided a turbidity sensor upstream or downstream the UV-radiation chamber 11, which allows to control the degree of exhaustion of the scrubbing liquor via the apparatus general microprocessor controller. Depending on the exhaustion degree of the scrubbing liquor, part of it or the whole is led to the collecting tank 16 for exhausted scrubbing liquor. The feeding tank 5 may be fed with ready-to-use scrubbing liquor or separately with a liquid solvent, preferably water, via inlet 14, and other ingredients and optionally further additives, via inlet 15. The scrubbing liquor is then prepared from the ingredients within or upstream the feeding tank 5, for example by the aid of an ultrasonic vibration device. The apparatus further comprises a by-pass line 17, so that it is possible to have only a part of the incoming air treated in the scrubber 3 with scrubbing liquor, while all of the incoming air passes the inlet filter 8 and the outlet filter 9.

Figure 2:
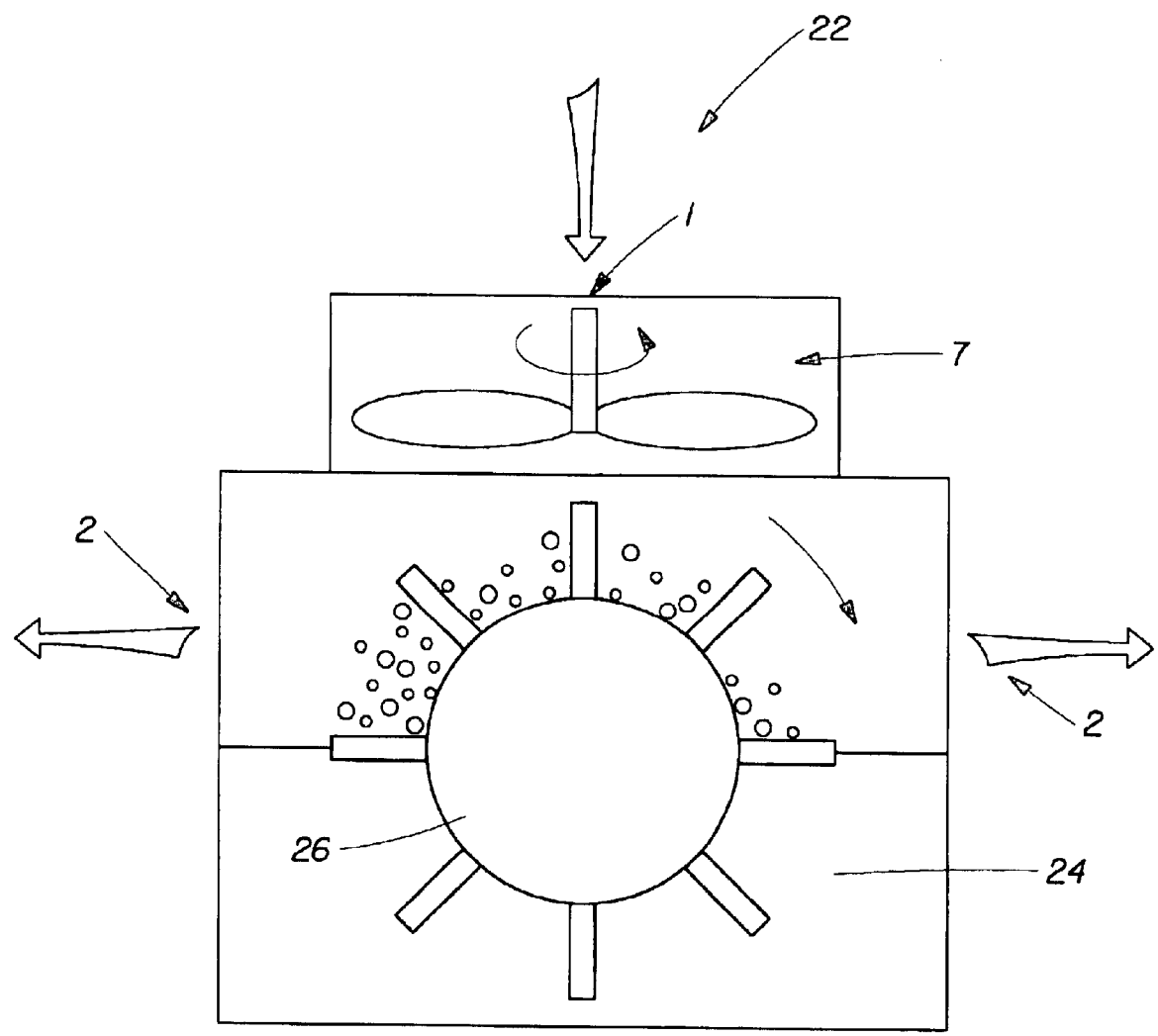
FIG. 2 is a schematic diagram of a non-limiting embodiment of the apparatus and method of the present invention in which the scrubbing apparatus is in the form of a revolving drum.

FIG. 2 shows another non-limiting embodiment in which the scrubbing apparatus, designated 22, is in the form of a revolving drum. The scrubbing liquor 24 is brought into contact with the air to be cleaned by one or more revolving paddle drums 26 that rotates inside the scrubbing liquor 24.

Figure 3:
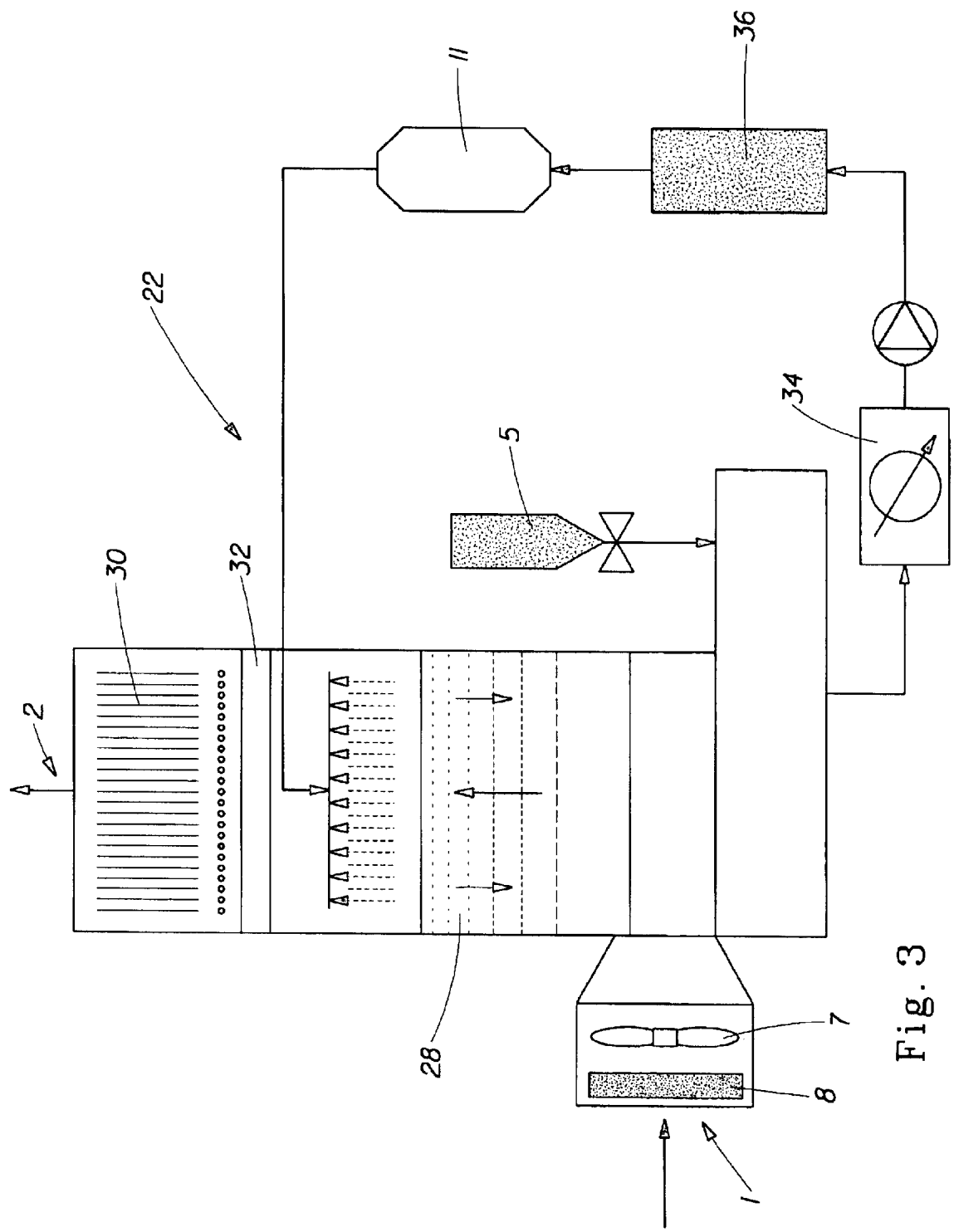
FIG. 3 is a schematic diagram of another non-limiting embodiment of the apparatus and method of the present invention in which the scrubbing apparatus is in the form of a packed column.
Figure 4:
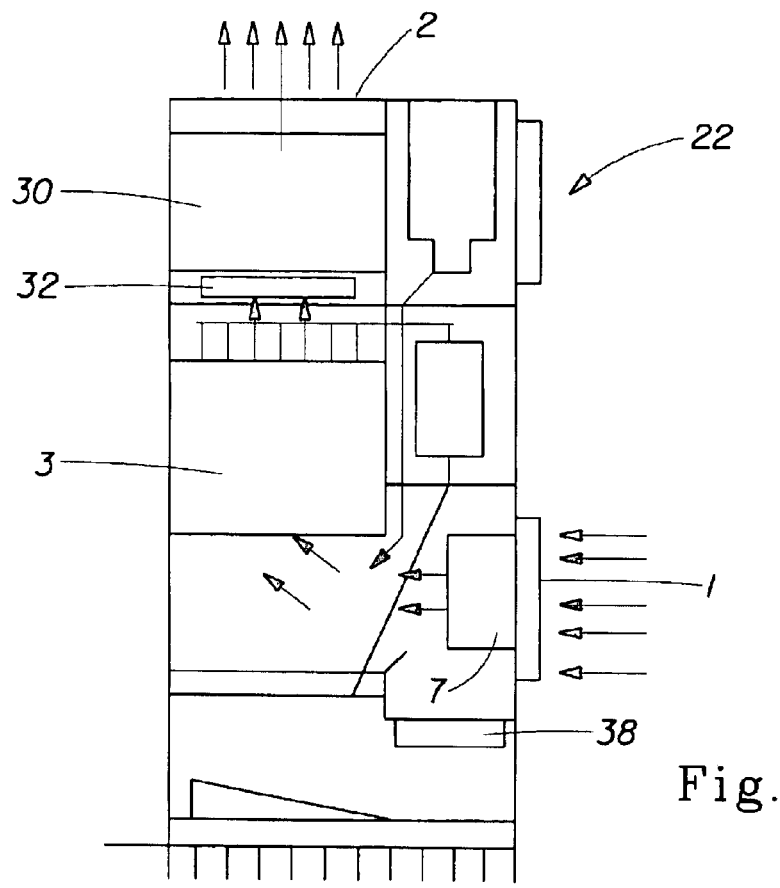
FIG. 4 is a cross-sectional side view of another non-limiting embodiment of an apparatus according to the present invention.
Figure 5:
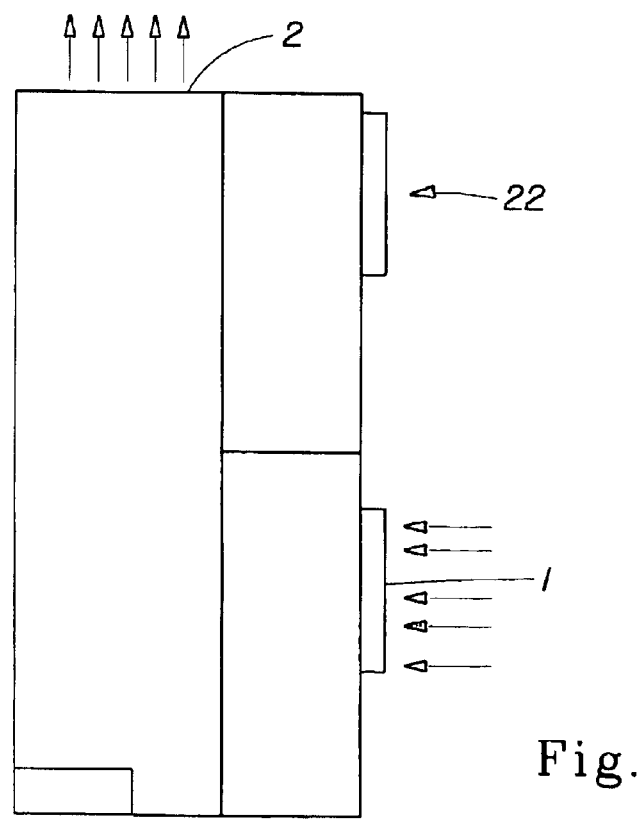
FIG. 5 is a side view of the apparatus shown in FIG. 4.
Figure 6:
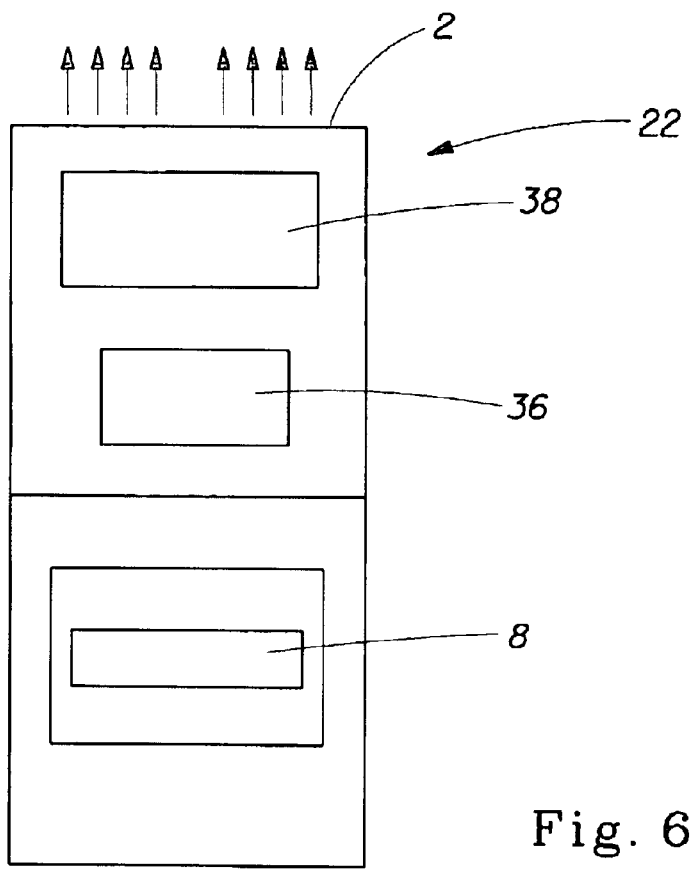
FIG. 6 is a front view of the apparatus shown in FIG. 4.
Figure 7:
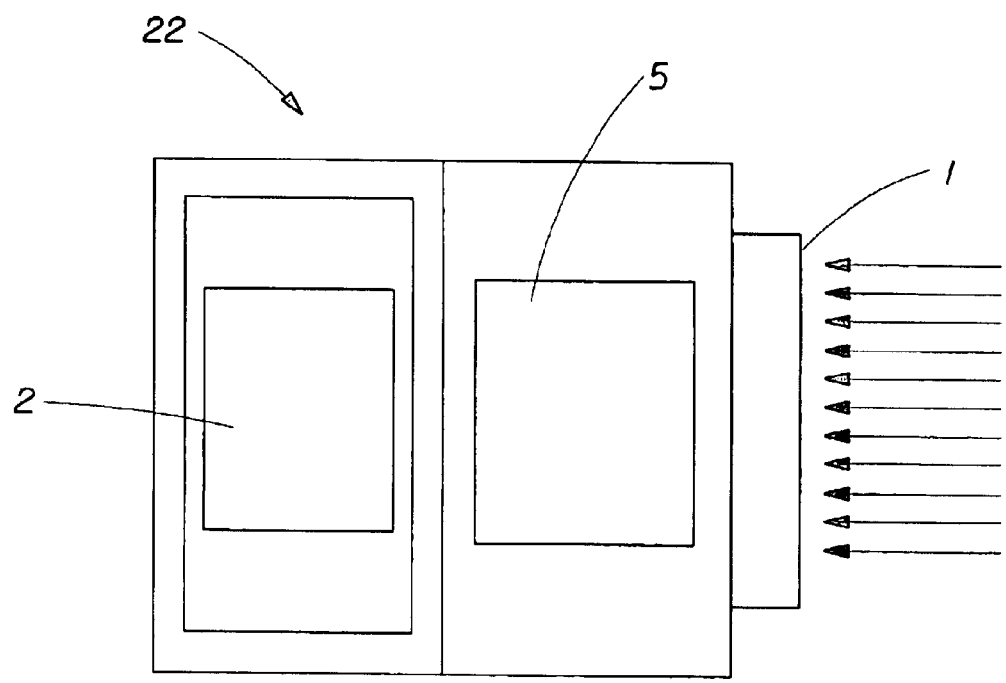
FIG. 7 is a top view of the apparatus shown in FIG. 4.

FIG. 3 is a schematic representation that shows another non-limiting embodiment in which the scrubbing apparatus designated generally by reference number 22, is in the form of a packed column. The scrubbing apparatus 22 comprises an air inlet 1, an air outlet 2, a feeding tank 5 for scrubbing liquor, a fan 7, a pre-filter 8, a UV/solution booster 11, a water scrubbing section 28, an electrostatic precipitation section 30, a demister 32, an optional cooling station 34, and another filter 36.

FIGS. 4–7 show a non-limiting example of a unit comprising the scrubbing apparatus. As shown in FIGS. 4–7, the unit (or scrubbing apparatus) 22 comprises air inlet 1, an air outlet 2, a scrubber 3, a refill compartment or tank 5 for scrubbing liquor, a fan 7, a pre-filter 8, an electrostatic precipitation section 30, a demister 32, a filter 36, and a one or more control panels 38.

The apparatus is preferably a "stand alone" type of device. The term "stand alone", as used herein, refers to devices that are capable of operating on their own without being connected to water pipes, pipes supplying compressed air, ducting, and the like in order to operate. The device preferably has a closed flow design, and is self-sufficient, as opposed to industrial air cleaning apparatus. The fluids used in the device preferably recirculate. The apparatus, of course, can be connected to an electrical wall outlet, and still be considered to be a stand alone device. The apparatus may be a stand alone device which is affixed to a wall, or some other surface, so that it is not portable. However, the apparatus is preferably also portable. The term "portable", as used herein, refers to devices that can be moved by the user. The apparatus, if portable, can be moved in a number of ways such as by carrying it, or by rolling it on wheels.

In other embodiments, however, the apparatus need not be either a stand alone device, or a portable device. In such other embodiments, for example, the apparatus may be part of a heating, ventilation, and/or air conditioning system. The use of the apparatus is also not limited to use in buildings. In other embodiments, for example, the apparatus may be used in vehicles, such as automobiles, aircraft, and other types of vehicles.

The apparatus, as shown in FIGS. 4–7, may be surrounded by a casing made of appropriate material, preferably plastics. The casing may comprise any means that facilitates the transport of the apparatus, for example wheels positioned at the bottom of the casing. Further, the casing may also comprise means which facilitate its operation, for example a display control board, whereby the operating modes of the apparatus can be controlled or modified, either automatically via sensors installed in the apparatus or manually by the consumer, via the apparatus microprocessor controller.

A liquid pump suitable for the device can be in the base of scrubber or in the circulation loop. Different technologies can be fruitfully used: gear pump, membrane pump, diaphragm pump, peristaltic pump and mono pump (especially if large particles in liquid suspension or viscous liquid are used as scrubbing liquor).

As noted above, an electrostatic precipitator (ESP) can be used in the apparatus. The apparatus can be fitted with virtually any type of known ESP, out of which the most common are: wire/tube ESP, wire/plate ESP & double stage ESP. The ESP discharge electrode is typically a cylindrical wire but can also be a barbed wire, a spiked wire, a square section wire, a grid (for plated ESP), a series of spikes. The ESP collector is typically a plain plate but can also be a grid, a pocketed plate, set of tubes. Different materials can be used: typically conductive metallic material but also impregnated plastic sheet with conductive coating. The ESP can also be run in wet conditions, either by spraying a liquid on the collector plates or allowing a film of liquid to run down the plates. In both cases the liquid function is to trap and take away the collected dust particles. In this specific application, the liquid can be either the scrubbing liquor of the purification device of the present invention or a different one (e.g. water or diluted aqueous caustic solution). In both cases, the liquid may be filtered before sending it back to the collector plates.

The air fan used in the device can be placed at different points of the system, such as the air inlet (operating in discharge towards the scrubber column) or in the air outlet (operation in suction towards the scubber column). The fan type can be centrifugal or axial, with a single or a double stage.

It is possible to use a refrigeration unit in the device. The purpose of the refrigeration unit is to keep the scrubbing liquor composition at a temperature at which it can be considered "non-evaporative" (dew point temperature) as described herein. The refrigeration unit such a unit can be achieved by any system known in the art, for instance Rankin vapor compression cycle, Peltier cells, or a magnetic refrigeration cycle.

The most preferable refrigeration unit would utilize a Rankin vapor compression cycle. In this case, the scrubbing liquor would typically run through a first heat exchanger (evaporator) and release heat to the refrigerant fluid used in the Rankin cycle. The cooled scrubbing liquor will reduce the air stream temperature as a consequence of the close interactions scrubbing liquor-air which take place in the scrubber. A second heat exchanger (condenser) can then rebalance the outlet air temperature by recovering the heat from the refrigerant. In such application, the inlet and outlet air are approximately in the same temperature and relative humidity conditions.

A refrigeration unit is not necessary when the characteristics of the scrubbing liquor used are "non-evaporative" even at room temperature, due to the specific chemical nature of its ingredients.

According to the invention, it has been found that by operating the above described apparatus with a scrubbing liquor, it is possible to adsorb both particulate impurities as well as vapor/gaseous contaminants, in particular VOC's, gases and free radicals, to thereby purify and enrich indoor ambient air. In addition, it has also been found that combining the outlet of said cleaning core with any filtration means for removing solid particles suspended into the air reduces the frequency for replacement or cleaning of said filtration means and increases its operational time. The apparatus of the invention includes a means (in the following also "cleaning core") for the uptake of a scrubbing liquor and for the removal of impurities dissolved or dispersed in the ambient air by contact with said scrubbing liquor. This cleaning core acts as a suitable support for the scrubbing liquor to ensure contact with the incoming ambient air and to allow and promote efficient material exchange between the air and the scrubbing liquor. The scrubbing liquor can be periodically or continuously fed from a scrubbing liquor feeding tank to the cleaning core to ensure an optimal efficiency of the scrubbing liquor. Using and disposing of a scrubbing liquor will be a much more simple and natural operation for the consumer than the frequent change of a filter. For this purpose, the apparatus comprises an outlet for discharging used scrubbing liquor and preferably a collecting tank that enables the periodic or continuous collection of exhausted scrubbing liquor. In a simpler embodiment the inlet and outlet of scrubbing liquor may be the same port.

Preferably, the apparatus according to the invention comprises an inlet filter, preferably a mechanical filter, any other type of particulate filter can be applied however, immediately before the cleaning core to eliminate larger particles contained in the ambient air, for example particles above 10–100 $\mu$m or more, which may cause a clogging of the cleaning core. Also preferably, the apparatus comprises one or more outlet filters immediately before the outlet for purified air to eliminate smaller solid particles and/or liquid droplets such as below 5–10 $\mu$m or even submicron particles contained in the purified air, for example particles below 0.3 $\mu$m. According to one embodiment, this outlet filter is an electrostatic precipitator device optionally followed by a means for trapping ozone. Such an electrostatic precipitator can also work as an ionizer for emitting negative ions to the purified air. In an alternative embodiment, there is a separate ionizer for treating the purified air, optionally followed by a means for trapping ozone contained in the purified air. Other suitable filters for removing particulate matter include, for example, fiber glass filters, electrostatic filters and non-woven filters, for example of HEPA or ULPA type.

Further preferably, the apparatus according to the invention comprises a recirculation system or means for periodically or continuously recirculating the scrubbing liquor through the cleaning core, in order to utilize its adsorption capacity to the maximum before it is discharged as described above. When using a recirculation of the scrubbing liquor, it is also preferable to provide a UV-radiation means to irradiate the scrubbing liquor during its recirculation to the cleaning core, thereby catalyzing the destruction of organic and biological contaminants by peroxides or photobleaching agents which may be present in the scrubbing liquor. Further preferably, there is provided a permanent or exchangeable filter to remove solid matter in the scrubbing liquor before it is recirculated to the cleaning core, thereby prolonging the utilization of the scrubbing liquor. Optionally, the apparatus according to the invention comprises a solid adsorbent packed bed in the scrubbing liquor recirculation loop, in order to clean-up said scrubbing liquor from absorbed pollutants.

It is preferred to provide a depletion sensor or sensor means to determine the exhaustion degree of the scrubbing liquor, in order to establish when the scrubbing liquor has reached a point where it is no longer further useable as a filtering and/or cleaning and/or enriching aid to the cleaning core. This sensor means could be for example a turbidity sensor, or a pH sensor, or a transparent control window for visual check.

The cleaning core may have different nature, construction and design, provided that it is apt to generate a high surface interface between the incoming air and the scrubbing liquor. According to one embodiment, the cleaning core is a miniaturized version of an industrial spray scrubber, which generates a spray of fine droplets of the scrubbing liquor for contact with the incoming ambient air. Such a scrubber is a very efficient means to remove vapor/gaseous contaminants from air. According to another embodiment, the cleaning core is a bubbling vessel containing the scrubbing liquor through which the incoming ambient air is bubbled, preferably in combination with an ultrasonic vibration device.

According to a preferred embodiment, the cleaning core is a column filled with suitably designed fillings or porous elements allowing the percolation of the scrubbing liquor from a scrubbing liquor distributor located in the upper part of said filling elements. The above mentioned cleaning cores operate in such a manner that the air and the scrubbing liquor will be in co-current, cross current or, preferably, counter-current flow, for example by providing an air inlet from the bottom and an air outlet from the top, or providing a scrubbing liquor inlet from the top and a scrubbing liquor outlet from the bottom. Any combination of scrubbing technologies and/or geometries could be utilized.

The scrubbing liquor can be refreshed periodically or continuously, by feeding scrubbing liquor from the feeding tank to the cleaning core. In one embodiment, the feeding tank can be a simple socket/docking station where a refill cartridge containing the scrubbing liquor is plugged-in by the consumer or it can be any refillable and/or movable storage reservoir. The feeding tank can be refilled with scrubbing liquor, or the apparatus according to the present invention comprises means for separately feeding a liquor solvent and optionally further additives, and means for preparing the scrubbing liquor therefrom within or upstream the scrubbing liquor feeding tank, for example by means of a stirring device or ultrasonic vibration device.

The outlet for discharging used scrubbing liquor can be a simple tap positioned on the apparatus to facilitate the discharge of the used scrubbing liquor or any storage tank (removable or not) out of which the used scrubbing liquor can be poured out.

The apparatus according to the present invention may also comprise controls, or means for controlling its operations such as a microprocessor, which can interact automatically with installed sensors or manually via the control board of the apparatus in order to optimize and customize the operation of the apparatus.

For example, the apparatus could be provided with a display board where the consumer may have the choice of changing the air flow rate by a switcher, or to activate/deactivate different devices of the apparatus such as the outlet ionizer. In another example, the apparatus could be fitted with automatic sensors such as VOC's, odor, humidity, temperature, dust sensors that switch the machine on/off or affect the machine operations when it is most appropriate.

The apparatus according to the present invention may also comprise means for adding air enhancers, for example fragrance or perfumes, to the purified air.

The apparatus according to the present invention may also comprise a line for bypassing the ambient air around the cleaning core, so that only a part of the incoming air is treated with scrubbing liquor. Preferably, this by-pass line is installed downstream the inlet filter, if present, but upstream the outlet filter, if present.

In another preferred embodiment, the apparatus of the present invention is not only an indoor air cleaning apparatus but an air cleaning and humidity control apparatus by further providing conventional or non-conventional air humidity control device or means within the apparatus. Preferably, the device controls the humidity of the air discharged from the device so that the air has the same humidity as the air taken into the device at the air inlet. The humidity control means can by way of example, and not by way of limitation, comprise: a cooling unit to extract moisture from the air before the air outlet, which is accompanied by a heater to heat the air back to ambient temperature; a non-evaporative scrubbing liquor; and/or a dessicant material located before the air outlet.

The Scrubbing Liquor

The scrubbing liquor that can be utilized in this invention contains aqueous or essentially non aqueous solvent and further additives selected from the group consisting of surfactants, organic solvents, inorganic or organic salts, oils, enzymes, bleaching agents, metal containing bleach catalysts, organic polymeric compounds, sequestration systems, chelating agents, builders, inclusion complexes, suds suppressors, dispersant, desiccant compounds, solid sorbents, photo-bleaching agents, coloring agents, perfumes, sanitizers, biocidals, antibacterial agents and antimicrobial agents, acidic and alkaline agents. The surfactants and the optional additives promote the mass transfer between the air and the liquid interface, and the solubilization of vapor/gaseous contaminants contained in the air. Thus, surfactants and the optional additives can be used to increase the ability of the scrubbing liquor to solubilize or absorb VOC's and other gaseous pollutants. Bleaching agents like perborates or photobleaching agents like peroxides can be used to destroy VOC's once they have been absorbed, preferably by the additional aid of an UV-radiation means or chamber during the recirculation of the scrubbing liquor through the cleaning core. Microorganisms, bacteria and viruses can be destroyed by the additional use of sanitizers, biocidals, antibacterial agents and antimicrobial agents. Preferably, the scrubbing liquor to be used in the apparatus of the invention is an aqueous scrubbing liquor comprising water as the liquid solvent.

The scrubbing liquor to be used inside of the air-cleaning device, in two non-limiting embodiments, can comprise:

an aqueous scrubbing liquor, i.e. water based scrubbing liquor with added ingredients with typical vapor tension of <0.1 mbar, to be chosen from the list described in the following paragraphs; or an essentially non aqueous scrubbing liquor, i.e. the scrubbing liquor is based on a non aqueous solvent, which is either hydrophilic or hydrophobic and has a typical vapor tension of <0.1 mbar, in order not to evaporate during its use in the air-cleaning device. Examples of such a solvent can be polyethers with ethoxy or propoxy functions such as PolyEthyleneGlycols, PolyPropyleneGlycols, PolyButyleneGlycols, or copolymers of these, glycerin, propylene glycol and other poly alcohols. Other examples can be oils such as paraffines, olefines, trigliceredes or other lipids. Those non-aqueous solvents may or may not comprise a percentage of water in their composition.

Both aqueous or essentially non-aqueous scrubbing liquor types may be capable to absorb water from the air moisture until they reach an equilibrium: when this equilibrium has been reached, the absorbed water amount in the scrubbing liquor can slightly change when moisture condition of the indoor air changes, reflecting a decrease of water amount in the scrubbing liquor when the air moisture decreases (dry conditions) until a new equilibrium with the air moisture is reached, and reflecting an increase of water amount in the scrubbing liquor when the air moisture increases (humid conditions) until a new equilibrium is reached. Net, it is possible to say that this non-aqueous or aqueous scrubbing liquor may remain always in equilibrium with the moisture present in the air, slightly changing its water content in the solvent and adjusting it to the current moisture level. The scrubbing liquor can be referred to as "non-evaporative scrubbing liquor". Preferably, the non-evaporative liquors useful herein are not oils.

Both aqueous or non-aqueous scrubbing liquors can behave as non-evaporative scrubbing liquors either for their chemical characteristics, as explained before, or for application of a cooling system that keeps them at the exact or lower temperature at which water tendency to evaporate from the scrubbing liquor is in equilibrium with air moisture content (said temperature is called "air dew point temperature"). The cooling system can be any conventional refrigeration device applied to the scrubbing liquor inside the cleaning apparatus while this is working. In another embodiment, the cooling cycle can be applied to the air instead of the liquid, in order to condense the excess humidity entrapped.

The final scrubbing liquor can be obtained in one of the following ways:

1) the scrubbing liquor is the same as the scrubbing liquor, i.e. there is no need for dilution;
2) the scrubbing liquor is obtained by diluting with water or other solvent a concentrated scrubbing liquor which could be a thick or thin liquid or gel; or
3) the scrubbing liquor is obtained by dilution with water or other solvent of a solid, which could be a powder or another solid form such as tablet, pill, etc. . .

Optional Additives for the Scrubbing Liquor

The following is a description of suitable and optional additives for use in the scrubbing liquor according to the present invention.

Surfactants

Nonionic Surfactants

The nonionic surfactants, which can be used in the present invention, may comprise essentially any alkoxylated nonionic surfactant. The ethoxylated and propoxylated nonionic surfactants are preferred. The nonionic surfactant, which can be used in the present invention, may also comprise polyhydroxy fatty acid amides, alkoxylated fatty acid amide, alkyl esters of a fatty acid, and alkylpolysaccharides (U.S. Pat. No. 4,565,647). Also suitable as nonionic surfactants for the purpose of the present invention are the semi-polar nonionic surfactants and co-surfactant selected from the group of primary or tertiary amines. Such components may be included in any suitable amount. When included therein, the scrubbing liquor in the present invention typically comprises from about 0.1% to about 40%, preferably from about 1% to about 15% by weight of such nonionic surfactants. (Unless otherwise specified herein, all percentages given in this specification are by weight.)

Anionic Surfactants

Suitable anionic surfactants to be included in the scrubbing liquor are linear alkyl benzene sulfonate, alkyl ester sulfonate surfactants, and alkyl sulfate surfactants. Other anionic surfactants useful for detersive purposes can also be included in the present invention. These can include salts (including, for example, sodium, potassium, ammonium, and substituted ammonium salts such as mono-, di- and triethanolamine salts) of soap, $C_8$–$C_{22}$ primary of secondary alkanesulfonates, $C_8$–$C_{24}$ olefinsulfonates, sulfonated polycarboxylic acids prepared by sulfonation of the pyrolyzed product of alkaline earth metal citrates, e.g., as described in British patent specification No. 1,082,179, $C_8$–$C_{24}$ alkylpolyglycolethersulfates (containing up to 10 moles of ethylene oxide); alkyl glycerol sulfonates, fatty acyl glycerol sulfonates, fatty oleyl glycerol sulfates, alkyl phenol ethylene oxide ether sulfates, paraffin sulfonates, alkyl phosphates, isethionates such as the acyl isethionates, N-acyl taurates, alkyl succinamates and sulfosuccinates, monoesters of sulfosuccinates (especially saturated and unsaturated $C_{12}$–$C_{18}$ monoesters) and diesters of sulfosuccinates (especially saturated and unsaturated $C_6$–$C_{12}$ diesters), acyl sarcosinates, sulfates of alkylpolysaccharides such as the sulfates of alkylpolyglucoside (the nonionic nonsulfated compounds being described below), branched primary alkyl sulfates, and alkyl polyethoxy carboxylates. Highly preferred anionic surfactants include alkyl alkoxylated sulfate surfactants. Furthermore, anionic surfactants suitable for application in the present invention are fluorinated anionic surfactants, such as perfluoroalkyl sulphates, perfluoroalkyl carboxylates, perfluoroalkyl phosphates, perfluoroalkyl sulphates.

Further examples of anionic surfactants are described in "Surface Active Agents and Detergents" (Vol. I and II by Schwartz, Perry and Berch). A variety of such surfactants are also generally disclosed in U.S. Pat. No. 3,929,678, issued Dec. 30, 1975 to Laughlin, et al. at Column 23, line 58 through Column 29, line 23 (incorporated by reference herein).

Such components may be included in any suitable amount. When included therein, the scrubbing liquor in the present invention typically comprises from about 0.1% to about 40%, preferably from about 1% to about 15% by weight of such anionic surfactants.

Cationic Surfactants

Any cationic surfactant is suitable for use in the present invention. Examples of such cationic surfactants include the ammonium surfactants.

Other cationic surfactants useful herein are also described in U.S. Pat. No. 4,228,044, Cambre, issued Oct. 14, 1980 and in European Patent Application EP 000,224.

Such components may be included in any suitable amount. When included therein, the scrubbing liquor in the present invention typically comprises from about 0.1% to about 40%, preferably from about 1% to about 15% by weight of such cationic surfactants.

Ampholytic Surfactants

Ampholytic surfactants are also suitable for use in the present invention. These surfactants can be broadly described as aliphatic derivatives of secondary or tertiary amines, or aliphatic derivatives of heterocyclic secondary and tertiary amines in which the aliphatic radical can be straight- or branched-chain. See U.S. Pat. No. 3,929,678 to Laughlin et al., issued Dec. 30, 1975 at column 19, lines 18–35, for examples of ampholytic surfactants. Other cationic surfactants suitable for application in the present invention are fluorinated cationic surfactants, such as perfluoroalkyl ammonium surfactants.

Such components may be included in any suitable amount. When included therein, the scrubbing liquor in the present invention typically comprises from about 0.1% to about 40%, preferably from about 1% to about 15% by weight of such ampholytic surfactants.

Zwitterionic Surfactants

Zwitterionic surfactants are also suitable for use herein. These surfactants can be broadly described as derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48, for examples of zwitterionic surfactants.

Such components may be included in any suitable amount. When included therein, the scrubbing liquor in the present invention typically comprises from about 0.1% to about 40%, preferably from about 1% to about 15% by weight of such zwitterionic surfactants.

Oils

Other suitable classes of ingredients that can be used in the scrubbing liquor formulation are oils or any hydrophobic liquid substance that is completely of partially immiscible with water. Oils would represent a hydrophobic part of the scrubbing liquor, particularly suitable for absorption of hydrophobic gaseous pollutants such as volatile aromatic compounds. Oils can be for instance emulsified or microemulsified by a number of methods that are well known in the art.

Examples of oils suitable for use in the scrubbing liquor are: paraffins (linear or branched hydrocarbons, e.g., squalane), fatty acids (oleic, palmitic, stearic, linoleic) and their gylcerides, natural oils (palm oil, coconut oil, linseed oil, castor oil, cotton seed oil, soybean oil).

Such components may be included in any suitable amount. When included therein, the scrubbing liquor in the present invention typically comprises from about 0.001% to about 100%, preferably from about 1% to about 30%, most preferably from 2% to about 20% by weight of such oils.

Enzymes

Proteases:

Suitable proteases are the subtilisins, which are obtained from particular strains of *B. subtilis* and *B. licheniformis* (subtilisin BPN and BPN'). One suitable protease is obtained from a strain of Bacillus, having maximum activity throughout the pH range of 8–12, developed and sold as ESPERASE® by Novo Industries A/S of Denmark, hereinafter "Novo". The preparation of this enzyme and analogous enzymes is described in GB 1,243,784 to Novo. Other suitable proteases include ALCALASE®, DURAZYM® and SAVINASE® (protease Subtilisin 309 from *Bacillius subtilis*) from Novo and MAXATASE®, MAXACAL®, PROPERASE® and MAXAPEM®) (protein engineered Maxacal) from Gist-Brocades. Also suitable for the present invention are proteases described in patent applications EP 251 446 and WO 91/06637, protease BLAP® described in WO91/02792 and their variants described in WO 95/23221. See also a high pH protease from Bacillus sp. NCIMB 40338 described in WO 93/18140 A to Novo. Formulations comprising protease, one or more other enzymes, and a reversible protease inhibitor are described in WO 92/03529 A to Novo. When desired, a protease having decreased adsorption and increased hydrolysis is available as described in WO 95/07791 to Procter & Gamble. A recombinant trypsin-like protease for detergents suitable herein is described in WO 94/25583 to Novo. Other suitable proteases are described in EP 516,200 by Unilever.

Proteolytic enzymes also encompass modified bacterial serine proteases, such as those described in EP 251 446, filed Apr. 28, 1987 (particularly the variant Y217L described on pages 17, 24 and 98) and in European Patent Application 199,404, Venegas, published Oct. 29, 1986. Suitable is a variant of an alkaline serine protease from Bacillus in which lysine replaced arginine at position 27, tyrosine replaced valine at position 104, serine replaced asparagine at position 123, and alanine replaced threonine at position 274. This protease enzyme is described in WO 91/06637. Genetically modified variants of the last are also included herein.

A preferred protease is a carbonyl hydrolase variant having an amino acid sequence not found in nature, as described in WO95/10591 and WO95/10592. Also suitable is a carbonyl hydrolase variant of the protease described in WO95/10591.

More preferred proteases are multiply-substituted protease variants. These protease variants comprise a substitution of an amino acid residue with another naturally occurring amino acid residue at an amino acid residue position corresponding to position 103 of *Bacillus amyloliquefaciens* subtilisin in combination with a substitution of an amino acid residue. Examples can be found in WO99/20727, WO99/20726 and WO99/20723 all filed on Oct. 23, 1998 from The Procter & Gamble Company). More preferred proteases for the purpose of the present invention are the proteolytic enzymes sold under the tradename Savinase by Novo Nordisk A/S.

Such components may be included in any suitable amount. The protease enzymes are normally incorporated in the scrubbing liquor composition at levels from about 0.0001% to about 2%, preferably about 0.0001% to about 0.1%, more preferably about 0.001% to about 0.05%, of pure enzyme by weight of the scrubbing liquor composition.

Alpha-amylase

As indicated above, the scrubbing liquor for use in the present invention will preferably comprise an $\alpha$-amylase. Suitable $\alpha$-amylases for the purpose of the present invention are described in the following: WO94/02597, Novo Nordisk A/S published Feb. 3, 1994, describes cleaning compositions which incorporate mutant amylases. See also WO95/10603, Novo Nordisk A/S, published Apr. 20, 1995. Other amylases known for use in cleaning compositions include both $\alpha$- and $\beta$-amylases. $\alpha$-Amylases are known in the art and include those disclosed in U.S. Pat. No. 5,003,257; EP 252,666; WO/91/00353; FR 2,676,456; EP 285,123; EP 525,610; EP 368,341; and British Patent specification no. 1,296,839 (Novo). Other suitable amylases are stability-enhanced amylases described in WO94/18314, published Aug. 18, 1994 and WO96/05295, Genencor, published Feb. 22, 1996 and amylase variants having additional modification in the immediate parent available from Novo Nordisk A/S, disclosed in WO 95/10603, published April 95. Also suitable are amylases described in EP 277 216, WO95/26397 and WO96/23873 (all by Novo Nordisk). Examples of commercial $\alpha$-amylases products are Purafect Ox Am® from Genencor and Termamyl®, Ban®, Fungamyl® and Duramyl®, all available from Novo Nordisk A/S Denmark. WO95/26397 describes other suitable amylases: $\alpha$-amylases characterised by having a specific activity at least 25% higher than the specific activity of Termamyl® at a temperature range of 25° C. to 55° C. and at a pH value in the range of 8 to 10, measured by the Phadebas® $\alpha$-amylase activity assay.

Preferred are variants of the above enzymes, described in WO96/23873 (Novo Nordisk). Other amylolytic enzymes with improved properties with respect to the activity level and the combination of thermal stability and a higher activity level are described in WO95/35382. Further suitable amylases are the H mutant $\alpha$-amylase enzymes exhibiting improved stability described in WO98/26078 by Genencor.

Such components may be included in any suitable amount. The α-amylases are normally incorporated in the scrubbing liquor composition at levels from about 0.0001% to about 2%, preferably about 0.0001% to about 0.1%, more preferably about 0.001% to about 0.05%, of pure enzyme by weight of the scrubbing liquor composition.

Lipases:

Lipases are also suitable for incorporation in the scrubbing liquor. Lipase enzymes include those produced by microorganisms of the Pseudomonas group, such as Pseudomonas stutzeri ATCC 19.154, as disclosed in British Patent 1,372,034. A suitable lipase is available from Amano Pharmaceutical Co. Ltd., Nagoya, Japan, under the trade name Lipase P "Amano," hereinafter referred to as "Amano-P". Other suitable commercial lipases include Amano-CES, lipases ex *Chromobacter viscosum*, e.g. *Chromobacter viscosum* var. lipolyticum NRRLB 3673 from Toyo Jozo Co., Tagata, Japan; *Chromobacter viscosum* lipases from U.S. Biochemical Corp., U.S.A. and Disoynth Co., The Netherlands, and lipases ex *Pseudomonas gladioli*. Especially suitable lipases are lipases such as M1 Lipase$^R$ and Lipomax$^R$ (Gist-Brocades) and Lipolase$^R$ and Lipolase Ultra$^R$ (Novo) which have found to be very effective when used in the present invention. Also suitables are the lipolytic enzymes described in EP 258 068, WO 92/05249 and WO 95/22615 by Novo Nordisk and in WO 94/03578, WO 95/35381 and WO 96/00292 by Unilever.

Also suitable are cutinases [EC 3.1.1.50] which can be considered as a special kind of lipase, namely lipases which do not require interfacial activation. Addition of cutinases to detergent compositions have been described in e.g. WO-A-88/09367 (Genencor); WO 90/09446 (Plant Genetic System) and WO 94/14963 and WO 94/14964 (Unilever).

Such components may be included in any suitable amount. The listed enzymes are normally incorporated in the scrubbing liquor composition at levels from about 0.0001% to about 2%, preferably about 0.0001% to about 0.1%, more preferably about 0.001% to about 0.05%, of pure enzyme by weight of the scrubbing liquor composition.

Cellulases:

The cellulases usable in the present invention include both bacterial or fungal cellulases. Preferably, they will have a pH optimum of between 5 and 12 and a specific activity above 50 CEVU/mg (Cellulose Viscosity Unit). Suitable cellulases are disclosed in U.S. Pat. No. 4,435,307, Barbesgoard et al, J61078384 and WO96/02653 which discloses fungal cellulase produced respectively from Humicola insolens, Trichoderma, Thielavia and Sporotrichum. EP 739 982 describes cellulases isolated from novel Bacillus species. Suitable cellulases are also disclosed in GB-A-2.075.028; GB-A-2.095.275; DE-OS-2.247.832 and WO95/26398.

Examples of especially suitable cellulases are cellulases described in European patent application No. 91202879.2, filed Nov. 6, 1991 (Novo). Carezyme and Celluzyme (Novo Nordisk A/S) are especially useful. See also WO91/17244 and WO91/21801. Other suitable cellulases for cleaning properties are described in WO96/34092, WO96/17994 and WO95/24471.

Other suitable ingredients that can be added are enzyme oxidation scavengers to protect possible degradation of the enzymes which are described in Copending European Patent application 92870018.6 filed on Jan. 31, 1992. Examples of such enzyme oxidation scavengers are ethoxylated tetraethylene polyamines. A range of enzyme materials and means for their incorporation into formulations is also disclosed in WO 9307263 A and WO 9307260 A to Genencor International, WO 8908694 A to Novo, and U.S. Pat. No. 3,553,139, Jan. 5, 1971 to McCarty et al. Enzymes are further disclosed in U.S. Pat. No. 4,101,457, Place et al, Jul. 18, 1978, and in U.S. Pat. No. 4,507,219, Hughes, Mar. 26, 1985. Enzyme materials useful for liquor formulations, and their incorporation into such formulations, are disclosed in U.S. 4,261,868, Hora et al, Apr. 14, 1981. Enzyme stabilisation systems are also described, for example, in U.S. Pat. No. 3,519,570. A useful Bacillus, sp. AC13 giving proteases, xylanases and cellulases, is described in WO 9401532 A to Novo.

Such components may be included in any suitable amount. The listed enzymes are normally incorporated in the scrubbing liquor composition at levels from about 0.0001% to about 2%, preferably about 0.0001% to about 0.1%, more preferably about 0.001% to about 0.05%, of pure enzyme by weight of the scrubbing liquor composition.

Bleaches

Bleaching Agents:

The bleaching agent component for use herein can be any of the bleaching agents useful for detergent compositions including oxygen bleaches, hypochloride as well as others known in the art. The bleaching agent suitable for the present invention can be an activated or non-activated bleaching agent.

The bleaching compositions used in the present invention can comprise a peroxygen bleach. Suitable peroxygen bleaches to be used herein are selected from the group comprising: hydrogen peroxide; water soluble sources of hydrogen peroxide; organic or inorganic peracids and peracid precursors; organic hydroperoxides; dialkyl peroxides; diacyl peroxides; and mixtures thereof.

As used herein a hydrogen peroxide source refers to any compound that produces perhydroxyl ions on contact with water. Suitable water-soluble sources of hydrogen peroxide for use herein include percarbonates, perborates, dipersulphates, monopersulphates (salts of Caro's acid, such as Oxone TM from Dupont), persilicates and mixtures thereof.

Suitable diacyl peroxides for use herein include aliphatic, aromatic and aliphatic-aromatic diacyl peroxides, and mixtures thereof. Suitable aliphatic diacyl peroxides for use herein are dilauroyl peroxide, didecanoyl peroxide, dimyristoyl peroxide, or mixtures thereof. A suitable aromatic diacyl peroxide for use herein is for example benzoyl peroxide. A suitable aliphatic-aromatic diacyl peroxide for use herein is for example lauroyl benzoyl peroxide.

Suitable organic or inorganic peracids for use herein include: persulphates such as monopersulfate; peroxyacids such as diperoxydodecandioic acid (DPDA); magnesium perphthalic acid; perlauric acid; phthaloyl amidoperoxy caproic acid (PAP); perbenzoic and alkylperbenzoic acids; and mixtures thereof.

Suitable hydroperoxides for use herein are tert-butyl hydroperoxide, cumyl hydroperoxide, 2,4,4-trimethylpentyl-2-hydroperoxide, di-isopropylbenzene-monohydroperoxide, tert-amyl hydroperoxide and 2,5-dimethyl-hexane-2,5-dihydroperoxide and mixtures thereof.

A preferred peroxygen bleach for use herein is selected from the group consisting of: hydrogen peroxide; water soluble sources of hydrogen peroxide; organic or inorganic peracids; hydroperoxides; and diacyl peroxides; and mixtures thereof. A more preferred peroxygen bleach herein is selected from the group consisting of hydrogen peroxide, water soluble sources of hydrogen peroxide and diacyl peroxides and mixtures thereof. An even more preferred peroxygen bleach herein is selected from the group consisting of hydrogen peroxide, water soluble sources of hydrogen peroxide, aliphatic diacyl peroxides, aromatic diacyl peroxides and aliphatic-aromatic diacyl peroxides and mixtures thereof. The most preferred peroxygen bleach for use in the scrubbing liquor is hydrogen peroxide, water soluble sources of hydrogen peroxide or mixtures thereof.

Such components may be included in any suitable amount. Preferably, the bleaching composition herein may comprise from about 0.01% to about 30%, preferably from about 0.05% to about 20%, more preferably from about 0.1% to about 15%, even more preferably from 0.15% to 10%, and most preferably from about 0.2% to about 10% by weight of the total composition of said peroxygen bleach.

Preferred bleaching agents for use in the present invention are the combination of percarbonate with a bleach activator selected from nonanoyloxybenzene-sulfonate (NOBS), Phenolsulfonate ester of N-nonanoyl-6-aminocaproic acid (NACA-OBS), and/or tetraacetylethylenediamine (TAED). Also preferred are the bleaching agents referred to as [Mn (Bcyclam)Cl$_2$].

Suitable bleaching agents for the purpose of the present invention include hydrogen peroxide, PB1, PB4 and percarbonate with a particle size of 400–800 microns. These bleaching agent components can include one or more oxygen bleaching agents and, depending upon the bleaching agent chosen, one or more bleach activators. When present oxygen bleaching compounds will typically be present at levels of from 0.1% to 30%, preferably 1% to 20% by weight of the scrubbing liquor.

One category of oxygen bleaching agent that can be used encompasses percarboxylic acid bleaching agents and salts thereof. Suitable examples of this class of agents include magnesium monoperoxyphthalate hexahydrate, the magnesium salt of meta-chloro perbenzoic acid, 4-nonylamino-4-oxoperoxybutyric acid and diperoxydodecanedioic acid. Such bleaching agents are disclosed in U.S. Pat. No. 4,483,781, U.S. patent application Ser. No. 740,446, European Patent Application 0,133,354 and U.S. Pat. No. 4,412,934. Highly preferred bleaching agents also include 6-nonylamino-6-oxoperoxycaproic acid as described in U.S. Pat. No. 4,634,551.

Another category of bleaching agents that can be used encompasses the halogen bleaching agents. Examples of hypohalite bleaching agents, for example, include trichloro isocyanuric acid and the sodium and potassium dichloroisocyanurates and N-chloro and N-bromo alkane sulphonamides. Such materials are normally added at 0.5–10% by weight of the scrubbing liquor, preferably 1–5% by weight.

The hydrogen peroxide releasing agents can be used in combination with bleach activators such as tetraacetylethylenediamine (TAED), nonanoyloxybenzene-sulfonate (NOBS, described in U.S. Pat. No. 4,412,934), 3,5-trimethylhexanoloxybenzenesulfonate (ISONOBS, described in EP 120,591) or pentaacetylglucose (PAG) or Phenolsulfonate ester of N-nonanoyl-6-aminocaproic acid (NACA-OBS, described in WO94/28106), which are perhydrolyzed to form a peracid as the active bleaching species, leading to improved bleaching effect. Also suitable activators are acylated citrate esters such as disclosed in EP 624 154 and in the Procter & Gamble WO98/04664. Those bleach activators are generally used within the scrubbing liquor compositions of the present invention at a level of 0.1–10%, preferably 0.5–5% by weight of the scrubbing liquor.

Useful bleaching agents, including peroxyacids and bleaching systems comprising bleach activators and peroxygen bleaching compounds for use in the present invention are described in PCT patent applications WO95/10592, WO97/00937, WO95/27772, WO95/27773, WO95/27774 and WO95/27775.

The hydrogen peroxide may also be present by adding an enzymatic system (i.e. an enzyme and a substrate therefore), which is capable of generating hydrogen peroxide at the beginning or during the cleaning process. Such enzymatic systems are disclosed in EP 537 381.

Bleaching agents other than oxygen bleaching agents are also known in the art and can be utilized herein. One type of non-oxygen bleaching agent of particular interest includes photoactivated bleaching agents such as the sulfonated zinc and/or aluminum phthalocyanines. Upon irradiation with light, in the presence of oxygen, the sulfonated zinc phthalocyanine is activated. Preferred zinc phthalocyanine and a photoactivated bleaching process are described in U.S. Pat. No. 4,033,718. Typically, the scrubbing liquor will contain about 0.025% to about 1.25%, by weight, of sulfonated zinc phthalocyanine.

Also suitable as bleaching species for the purpose of the present invention are bleach boosters that may be used in conjunction with a peroxygen source in a bleaching composition. The bleach booster is generally present in the scrubbing liquor at a level of from 0.01–10% and more preferably from 0.05–5% by weight of the scrubbing liquor. Bleach boosters to be included in the scrubbing liquor used in the present invention comprise zwitterionic imines, anionic imine polyions having a net negative charge of from about −1 to about −3, and mixtures thereof.

Preferred bleach boosters are the anionically charged moiety bonded to the imine nitrogen described in WO97/10323. Also preferred are the tri:cyclic oxaziridinium compounds described in U.S. Pat. No. 5,710,116 and the bleach boosters described in WO98/16614. These can be prepared in accordance with the method described in WO97/10323 and/or WO98/16614.

Metal-containing Bleach Catalysts

The compositions described herein which contain bleach as detergent component may additionally contain as a preferred component, a metal containing bleach catalyst. Preferably the metal containing bleach catalyst is a transition metal containing bleach catalyst, more preferably a manganese or cobalt-containing bleach catalyst.

The compositions of the present invention may comprise an effective amount of a bleach catalyst. The term "an effective amount" is defined as "an amount of the transition-metal bleach catalyst present in the present invention compositions, or during use according to the present invention methods, that is sufficient, under whatever comparative or use conditions are employed, to result in at least partial oxidation of the material sought to be oxidized by the composition or method."

Bleach catalysts are described, for example, in U.S. Pat. No. 5,246,621 and U.S. Pat. No. 5,244,594 (manganese-based complexes), U.S. Pat. No. 4,430,243 (heavy metal catalysts), U.S. Pat. No. 4,246,612 and U.S. Pat. No. 5,227,084 (mononuclear manganese complexes), U.S. Pat. No. 5,114,611 (transition metal complexes), European patent application, publication no. 408,131 (cobalt complex catalysts), European patent applications, publication nos. 384,503, and 306,089 (metallo-porphyrin catalysts), U.S. Pat. No. 4,728,455 (manganese/multidentate ligand catalyst), U.S. Pat. No. 4,711,748 and European patent application, publication no. 224,952, (absorbed manganese on aluminosilicate catalyst), U.S. Pat. No. 4,601,845 (aluminosilicate support with manganese and zinc or magnesium salt), U.S. Pat. No. 4,626,373 (manganese/ligand catalyst), U.S. Pat. No. 4,119,557 (ferric complex catalyst), German Pat. specification 2,054,019 (cobalt chelant catalyst) Canadian 866,191 (transition metal-containing salts), U.S. Pat. No. 4,430,243 (chelants with manganese cations and non-catalytic metal cations), and U.S. Pat. No. 4,728,455 (manganese gluconate catalysts).

Other cobalt catalysts suitable for incorporation into the scrubbing liquor compositions of the present invention may be produced according to the synthetic methods disclosed in U.S. Pat. Nos. 5,559,261, 5,581,005, and 5,597,936, the disclosures of which are herein incorporated by reference. A further description of the bleach catalysts of the present invention can be found in WO 98/39406 A1, published Sep. 11, 1998, WO 98/39098 A1, published Sep. 11, 1998, and WO 98/39335 Al, published Sep. 11, 1998, all of which are included herein by reference.

All listed bleaching agents may be used in the scrubbing liquor inside the cleaning device with or without the combination of UV light emission to increase or adjust their bleaching performance.

Photobleaching Agents:

In the disclosed application, virtually any type of photobleaching agent can be used. Examples of photobleaching agents that would be suitable are: Titanium dioxide (Anatase form), Zincum oxide, and Cadmium sulphide.

Those photobleaching agents can be incorporated in the scrubbing liquor in many different ways among which: nano-particles (10 to 20 nm) dispersion in the scrubbing liquor, coated in the scrubbing column packing material, coated on the walls of the scrubbing device, a dedicated reactor casing with numerous photobleaching agent coated parts of different possible shapes (spheres, tiles, rashig rings, pall rings, etc. . . . ) inside the reactor casing.

Other photobleaching agents suitable for the present invention are photoactivated bleaching agents such as phthalocyanines and naphthalocyanines sulfonated zinc and/or aluminum phthalocyanines, see U.S. Pat. No. 4,033,718, issued Jul. 5, 1977 to Holcombe et al., such as zinc phthalocyanine tri- and tetra-sulfonates. Other suitable compounds are porphines described in U.S. Pat. Nos. 2,951,797; 2,951,798; 2,951,799 and 2,951,800, assigned to Monsanto Chemical Company and issued on Sep. 6, 1960, carboxylated porphines appeared in U.S. Pat. No. 2,706,199 issued Apr. 12, 1955, aminosulfonyl porphines described in West German OLS No. 2,057,194 and other substituted porphines are disclosed in Austrian Pat. No. 267,711 issued Jan. 10, these applications are hereby incorporated herein by reference.

Such components may be included in any suitable amount. If used, scrubbing liquor compositions will typically contain from about 0.025% to about 1.25%, by weight, of such bleaches, especially sulfonate zinc phthalocyanine.

If desired, the bleaching compounds can be catalyzed by means of a manganese compound. Such compounds are well known in the art and include, for example, the manganese-based catalysts disclosed in U.S. Pat. No. 5,246,621, U.S. Pat. No. 5,244,594; U.S. Pat. No. 5,194,416; U.S. Pat. No. 5,114,606; and European Pat. App. Pub. Nos. 549,271A1, 549,272A1, 544,440A2, and 544,490A1; Preferred examples of these catalysts include $Mn^{IV}_2(u\text{-}O\text{-})_3$ (1,4,7-trimethyl-1,4,7-triazacyclononane)$_2$ (PF$_6$)$_2$, $Mn^{III}_2(u\text{-}O\text{-})_1(u\text{-}OAc)_2$ (1,4,7-trimethyl-1,4,7-triazacyclononane)$_2$-(ClO$_4$)$_2$, $Mn^{IV}_4(u\text{-}O\text{-})_6$ (1,4,7-triazacyclononane)$_4$ (ClO$_4$)$_4$, $Mn^{III}Mn^{IV}_4(u\text{-}O\text{-})_1(u\text{-}OAc)_2$-(1,4,7-trimethyl-1,4,7-triazacyclononane)$_2$ (ClO$_4$)$_3$, $Mn^{IV}$ (1,4,7-trimethyl-1,4,7-triazacyclononane)-(OCH$_3$)$_3$ (PF$_6$), and mixtures thereof. Other metal-based bleach catalysts include those disclosed in U.S. Pat. No. 4,430,243 and U.S. Pat. No. 5,114,611. The use of manganese with various complex ligands to enhance bleaching is also reported in the following U.S. Pat. Nos.: 4,728,455; 5,284,944; 5,246,612; 5,256,779; 5,280,117; 5,274,147; 5,153,161; and 5,227,084.

As a practical matter, and not by way of limitation, the compositions and processes herein can be adjusted to provide on the order of at least one part per ten million of the active bleach catalyst species in the aqueous washing liquor, and will preferably provide from about 0.1 ppm to about 700 ppm, more preferably from about 1 ppm to about 500 ppm, of the catalyst species in the scrubbing liquor.

Those photobleaching agents would then be irradiated by an UV-light source incorporated in the device in close contact or very near to the photobleaching agent. The UV-light source emitted light wavelength suitable for the disclosed application is typically between 150 to 800 nm, preferably between 200 nm and 300 nm, more preferably between 220 and 280 nm. The UV-light source emitted light power suitable for the disclosed application is typically between 1 Watt and 200 Watts, preferably between 2 Watts and 80 Watts, more preferably between 3 Watts and 30 Watts.

Builders and Sequestration Agents

Detergent builders and sequestration agents can optionally be included in the compositions herein to assist in controlling mineral hardness. Inorganic as well as organic builders can be used. Builders are typically used in fabric laundering compositions to assist in the removal of particulate soils. Preferably the compositions comprise form about 10% to about 50% by weight, of a builder, however, as described further herein below, the amount of builder present will vary depending upon the type of builder which is used and the type of embodiment, into which the builder is formulated.

Examples of such builders are P-containing builders (polyphosphates), phosphonates, phutic acid, silicates (U.S. Pat. No. 4,664,839), carbonates (German Patent Application No. 2,321,001) including bicarbonates and sesquicarbonates, sulfates, aluminosilicates (U.S. Pat. No. 3,985,669), and zeolites.

The level of builder can vary widely depending upon the end use of the composition and its desired physical form. When present, the compositions will typically comprise at least about 0.1% builder. Liquid formulations typically comprise from about 5% to about 50%, more typically about 5% to about 30%, by weight, of detergent builder. Lower or higher levels of builder, however, are not excluded.

Organic detergent builders suitable for the purposes of the present invention include, but are not restricted to, a wide variety of polycarboxylate compounds. One important category of polycarboxylate builders encompasses the ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987. Suitable ether polycarboxylates also include cyclic compounds, particularly alicyclic compounds, such as those described in U.S. Pat. Nos. 3,923,679; 3,835,163; 4,158,635; 4,120,874. Also builders described in U.S. Pat. Nos. 4,102,903, 4,566,984. and in European Patent Application EP 0,200,263. Other suitable polycarboxylates are disclosed in U.S. Pat. No. 4,144,226, Crutchfield et al, issued Mar. 13, 1979 and in U.S. Pat. No. 3,308,067, Diehl, issued Mar. 7, 1967. See also Diehl U.S. Pat. No. 3,723,322. Fatty acids, e.g., C.sub.12-C.sub.18 monocarboxylic acids, can also be incorporated into the compositions alone, or in combination with the aforesaid builders.

Inclusion Complexes

The scrubbing liquor herein may also optionally contain one or more types of inclusion complexes as ingredients, such as clathrates, cyclodextrins or calyxarene compounds. Inclusion compounds are a cage structure capable of including another compound within its own structure geometry: the cavities are usually cages or tunnels; layered compounds or combinations of these structures may be considered as inclusion complexes.

Such components may be included in any suitable amount. Typical levels of inclusion complexes in usage conditions for the scrubbing liquor are from about 0.01% to about 25%, preferably from about 1% to about 15% by weight of the composition.

Suds Suppressors

Another optional ingredient is a suds suppressor, exemplified by silicones, and silica-silicone mixtures. Preferred silicone suds controlling agent is disclosed in Bartollota et al. U.S. Pat. No. 3,933,672. Other particularly useful suds suppressors are described in German Patent Application DTOS 2 646 126 published Apr. 28, 1977, Copending European Patent application N 92870174.7 filed Nov. 10, 1992, and Copending European Patent application N°92201649.8. Such components may be included in any suitable amount. The suds suppressors described above are normally employed at levels of from about 0.001% to about 2% by weight of the scrubbing liquor, preferably from about 0.01% to about 1% by weight.

Dispersants

The scrubbing liquor used in the present invention can also contain dispersants. The dispersants types that can be used in the present invention can be briefly summarised as builders, antinucleation agents, crystal growth inhibitors, anti coagulation agents, antideposition agents, deflocculating agents and rehology control agents. Examples of suitable dispersing agents to be used in the present invention are smectite clays, water-soluble organic salts are the homo- or co-polymeric acids or their salts, water soluble organic homo- or co-polymeric polycarboxylic acids, modified polycarboxylates or their salts (GB-A-1,596,756), polyamine and modified polyamine compounds (EP-A-305282, EP-A-305283 and EP-A-351629).

Examples of such dispersants are polyacrylates of molecular weight 2000–10000 and their copolymers with any suitable other monomer units including modified acrylic, fumaric, maleic, itaconic, aconitic, mesaconic, citraconic and methylenemalonic acid or their salts, maleic anhydride, acrylamide, alkylene, vinylmethyl ether, styrene and any mixtures thereof. Preferred are the copolymers of acrylic acid and maleic anhydride having a molecular weight of from 5,000 to 100,000, more preferably from 20,000 to 100,000.

Other optional polymers may polyvinyl alcohols and acetates both modified and non-modified, cellulosics and modified cellulosics, polyoxyethylenes, polyoxypropylenes, and copolymers thereof, both modified and non-modified, terephthalate esters of ethylene or propylene glycol or mixtures thereof with polyoxyalkylene units. Suitable examples are disclosed in U.S. Pat. Nos. 5,591,703, 5,597,789 and 4,490,271. The scrubbing liquor used in the invention may also contain a lime soap peptiser compound.

Organic Polymeric Compounds

Organic polymeric compounds may be added as preferred components of the compositions in accord with the invention. By organic polymeric compound it is meant essentially any polymeric organic compound commonly found in detergent compositions having dispersant, anti-redeposition, soil release agents crystal growth inhibition or other detergency properties. Organic polymeric compound includes also all types of organic dessicants.

Such components may be included in any suitable amount. Organic polymeric compounds are typically incorporated in the scrubbing liquor compositions of the invention at a level of from about 0.1% to about 100%, preferably from about 0.5% to about 60%, most preferably from about 1% to about 10% by weight of the compositions.

These polymers have the ability to complex or adsorb the pollutants in solution before they have the opportunity to become again air-born. They can also disperse solid matter entrapped in the scrubber liquor in a way that this solid matter does not form agglomerates or make-up and thus it does not clog any part of the device. Besides, they can be useful in the process of dispersing any solid matter present in the scrubbing liquor, for example a solid adsorbent, thus avoiding said solid matter to clog some parts of the cleaning device or to sediment in some part of the cleaning device. Especially suitable polymeric agents are polyamine N-oxide polymers, copolymers of N-vinylpyrrolidone and N-vinylimidazole, polyvinylpyrrolidone polymers, polyvinyloxazolidones and polyvinylimidazoles or mixtures thereof.

a) Polyamine N-oxide Polymers

The polyamine N-oxide polymers suitable for use contain units having the following structure formula:

(I)

wherein P is a polymerisable unit, whereto the R—N—O group can be attached to or wherein the R—N—O group forms part of the polymerisable unit or a combination of both.

A is

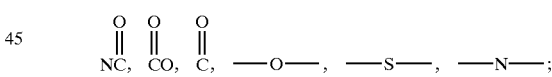

x is 0 or 1;

R are aliphatic, ethoxylated aliphatics, aromatic, heterocyclic or alicyclic groups or any combination thereof whereto the nitrogen of the N—O group can be attached or wherein the nitrogen of the N—O group is part of these groups.

The N—O group can be represented by the following general structures:

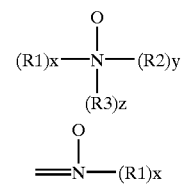

wherein R1, R2, and R3 are aliphatic groups, aromatic, heterocyclic or alicyclic groups or combinations thereof, x or/and y or/and z is 0 or 1 and wherein the nitrogen of the N—O group can be attached or wherein the nitrogen of the N—O group forms part of these groups.

The N—O group can be part of the polymerisable unit (P) or can be attached to the polymeric backbone or a combination of both. Suitable polyamine N-oxides wherein the N—O group forms part of the polymerisable unit comprise polyamine N-oxides wherein R is selected from aliphatic, aromatic, alicyclic or heterocyclic groups. One class of such polyamine N-oxides comprises the group of polyamine N-oxides wherein the nitrogen of the N—O group forms part of the R-group. Preferred polyamine N-oxides are those wherein R is a heterocyclic group such as pyrridine, pyrrole, imidazole, pyrrolidine, piperidine, quinoline, acridine and derivatives thereof. Another class of said polyamine N-oxides comprises the group of polyamine N-oxides wherein the nitrogen of the N—O group is attached to the R-group.

Other suitable polyamine N-oxides are the polyamine oxides whereto the N—O group is attached to the polymerisable unit. A preferred class of these polyamine N-oxides are the polyamine N-oxides having the general formula (I) wherein R is an aromatic, heterocyclic or alicyclic groups wherein the nitrogen of the N—O functional group is part of said R group. Examples of these classes are polyamine oxides wherein R is a heterocyclic compound such as pyrridine, pyrrole, imidazole and derivatives thereof.

Another preferred class of polyamine N-oxides is the polyamine oxides having the general formula (I) wherein R is aromatic, heterocyclic or alicyclic groups wherein the nitrogen of the N—O functional group is attached to the R groups. Examples of these classes are polyamine oxides wherein R groups can be aromatic such as phenyl.

Any polymer backbone can be used as long as the amine oxide polymer formed is water-soluble and has dye transfer inhibiting properties. Examples of suitable polymeric backbones are polyvinyls, polyalkylenes, polyesters, polyethers, polyamide, polyimides, polyacrylates and mixtures thereof.

The amine N-oxide polymers suitable for use in the scrubbing liquor typically have a ratio of amine to the amine N-oxide of about 10:1 to about 1:1,000,000. However the amount of amine oxide groups present in the polyamine oxide polymer can be varied by appropriate copolymerization or by appropriate degree of N-oxidation. Preferably, the ratio of amine to amine N-oxide is from about 2:3 to about 1:1,000,000. More preferably from about 1:4 to about 1:1,000,000, most preferably from about 1:7 to about 1:1,000,000. The polymers suitable for use in the scrubbing liquor actually encompass random or block copolymers where one monomer type is an amine N-oxide and the other monomer type is either an amine N-oxide or not. The amine oxide unit of the polyamine N-oxides has a PKa<10, preferably PKa<7, more preferred PKa<6.

The polyamine oxides can be obtained in almost any degree of polymerisation. The degree of polymerisation is not critical provided the material has the desired water-solubility and dye-suspending power.

Typically, the average molecular weight is within the range of about 500 to about 1,000,000; preferably from about 1,000 to about 50,000, more preferably from about 2,000 to about 30,000, most preferably from about 3,000 to about 20,000.

b) Copolymers of N-vinylpyrrolidone and N-vinylimidazole

The N-vinylimidazole N-vinylpyrrolidone polymers used in the scrubbing liquor preferably have an average molecular weight range from about 5,000 to about 1,000,000, more preferably from about 5,000 to about 200,000.

Highly preferred polymers for use in scrubbing liquors according to the present invention comprise a polymer selected from N-vinylimidazole N-vinylpyrrolidone copolymers wherein said polymer has an average molecular weight range from about 5,000 to about 50,000 more preferably from about 8,000 to about 30,000, most preferably from about 10,000 to about 20,000.

The average molecular weight range was determined by light scattering as described in Barth H. G. and Mays J. W. Chemical Analysis Vol 113, "Modern Methods of Polymer Characterization". Highly preferred N-vinylimidazole N-vinylpyrrolidone copolymers have an average molecular weight range from about 5,000 to about 50,000; more preferably from about 8,000 to about 30,000; most preferably from about 10,000 to about 20,000.

The N-vinylimidazole N-vinylpyrrolidone copolymers characterized by having said average molecular weight range provide excellent dye transfer inhibiting properties while not adversely affecting the cleaning performance of detergent compositions formulated therewith. The N-vinylimidazole N-vinylpyrrolidone copolymer suitable for use in the present invention preferably has a molar ratio of N-vinylimidazole to N-vinylpyrrolidone from about 1 to about 0.2, more preferably from about 0.8 to about 0.3, most preferably from about 0.6 to about 0.4.

c) Polyvinylpyrrolidone

The scrubbing liquor in the present invention may also utilize polyvinylpyrrolidone ("PVP") having an average molecular weight of from about 2,500 to about 400,000, preferably from about 5,000 to about 200,000, more preferably from about 5,000 to about 50,000, and most preferably from about 5,000 to about 15,000. Suitable polyvinylpyrrolidones are commercially available from ISP Corporation, New York, N.Y. and Montreal, Canada under the product names PVP K-15 (viscosity molecular weight of 10,000), PVP K-30 (average molecular weight of 40,000), PVP K-60 (average molecular weight of 160,000), and PVP K-90 (average molecular weight of 360,000). Other suitable polyvinylpyrrolidones which are commercially available from BASF Cooperation include Sokalan HP 165 and Sokalan HP 12; polyvinylpyrrolidones known to persons skilled in the detergent field (see for example EP-A-262,897 and EP-A-256,696).

d) Polyvinyloxazolidone

The scrubbing liquor in the present invention may also utilize polyvinyloxazolidone as a polymeric agent. Said polyvinyloxazolidones have an average molecular weight of from about 2,500 to about 400,000, preferably from about 5,000 to about 200,000, more preferably from about 5,000 to about 50,000, and most preferably from about 5,000 to about 15,000.

e) Polyvinylimidazole

The scrubbing liquor in the present invention may also utilize polyvinylimidazole as polymeric agent. Said polyvinylimidazoles have an average about 2,500 to about 400,000, preferably from about 5,000 to about 200,000, more preferably from about 5,000 to about 50,000, and most preferably from about 5,000 to about 15,000.

f) Cross-linked Polymers

Cross-linked polymers are polymers whose backbone are interconnected to a certain degree; these links can be of chemical or physical nature, possibly with active groups in the backbone or on branches; cross-linked polymers have been described in the Journal of Polymer Science, volume 22, pages 1035–1039. In one embodiment, the cross-linked polymers are made in such a way that they form a three-dimensional rigid structure, which can entrap dyes in the pores formed by the three-dimensional structure. In another embodiment, the cross-linked polymers entrap the dyes by swelling. Such cross-linked polymers are described in European patent application 94870213.9.

g) Polyethylene Glycols

Polyethylene glycols may be a major part of the scrubbing liquor of the present invention. Polyethylene glycols can provide both gaseous organic absorption and non-evaporative properties. Polyethylene glycols that can be utilized can vary in molecular weight from about 200 to about 10,000, preferably from about 200 to about 1,000. Such components may be included in any suitable amount. Polyethylene glycols can comprise from about 0.01% to about 100% of the scrubbing liquor. Polyethylene glycols are colorless in liquid form, water soluble, hygroscopic, soluble in and often miscible with aromatic hydrocarbons and other organic solvents. Thus, they add a wide range of positive properties to the scrubbing liquor.

Dessicant Compounds

The scrubbing liquor in the present invention may also utilize as ingredients dessicant compounds. With the term dessicant compounds, it is herein intended to refer to any inorganic or organic compound that is able to decrease water tension of vapor in the scrubbing liquor or has a very low vapor pressure or can extract water from humid air (desiccant). When used in suitable amounts, these desiccant compounds can decrease the water tension of vapor in the scrubbing liquor up to the point in which the scrubbing liquor can be considered a "non evaporative solvent" as defined previously.

Desiccant compounds can be inorganic or organic molecules. Examples of inorganic dessicant compounds are: $CaCl_2$, $MgCl_2$, LiBr, LiCl, $K_2CO_3$, $Pb(NO_3)_2$, KF, $NaSO_4$, $K_3PO_4$, $CrO_3$, $NaNO_2$, $Mg(NO_3)_2$, KSCN, $KC_2H_3O_2$, $Zn(NO_3)_2$, $ZnBr_2$, $K_2HPO_4$, $NaClO_3$, silica gel, silicates, aluminas, zeolites, carbon, molecular sieves. Prefered inorganic desiccants are $K_3PO_4$, $K_2CO_3$, and $CaCl_2$. Examples of organic desiccant compounds are polyalcohols, polyethers, polysaccharides, polyacrylamides, polyacrylates and combinations or mixtures thereof. Prefered organic desiccants are polyethylene glycol 300, polypropylene glycol 700, block copolymers of polyethylene glycol and polypropylene glycol, and glycerol. Other suitable compounds are the ones known as advanced dessicant materials, such as 2-acrylomido-2-methyl-1 propane-sulphonic acid (AMPSA) and polystyrene sulfonic acid (PSSA) and their salts with sodium, lithium, potassium and cesium. The aforementioned desiccants can be combined with non-evaporative organic molecules, which have low vapor pressure at ambient temperature (high boiling point), thus do not release molecules in the air, when in contact with ambient air. Examples of such molecules are silicon oils, high molecular weight polymers, mineral oils, organic acids, and hydrocarbons. Prefered non-evaporative organic molecules are squalene and castor oil. Finally, aforementioned non-evaporative organic molecules can be used even in the absence of desiccants as main components of the scrubbing liquor.

Such components may be included in any suitable amount. The scrubbing liquor in the present invention may incorporate dessicant compounds at a level of from about 0.1% to about 100%, preferably from about 0.5% to about 65%, most preferably from about 1% to about 55% by weight of the compositions.

Solid Adsorbents

The scrubbing liquor in the present invention may also utilize as ingredients solid sorbents. With the term "solid sorbents", it is herein intended any solid material, in whatever physical form, that has characteristics of adsorbing inorganic or organic molecules.

These solid sorbents can be introduced inside the scrubbing liquor as a suspension, as a deposit, or as a filter media; they can also be implemented in the air cleaning device, fixed on a solid part of the device itself, such as the packing material or a wall or a casing.

Examples of solid sorbents that may be possibly used in the proposed invention are: activated carbon (in granular, amorphous, fiber, extrudate, or powder form), impregnated or coated or chemically modified activated carbon, silica, chemically modified silica, zeolites, chemically modified zeolites, aluminas, chemically modified aluminas.

Examples of suitable solid sorbents are the largely water insoluble sodium aluminosilicates (soluble at extreme values of pH). Suitable aluminosilicates include the aluminosilicate zeolites having the unit cell formula $Na_z[(AlO_2)_z(SiO_2)y] \cdot xH_2O$ wherein z and y are at least 6; the molar ratio of z to y is from 1.0 to 0.5 and x is at least 5, preferably from 7.5 to 276, more preferably from 10 to 264. The aluminosilicate material are in hydrated form and are preferably crystalline, containing from 10% to 28%, more preferably from 18% to 22% water in bound form.

The aluminosilicate zeolites can be naturally occurring materials, but are preferably synthetically derived. Synthetic crystalline aluminosilicate ion exchange materials are available under the designations Zeolite A, Zeolite B, Zeolite P, Zeolite X, Zeolite HS, Zeolite Y, ZSM5, and mixtures thereof.

A preferred method of synthesizing aluminosilicate zeolites is that described by Schoeman et al (published in Zeolite (1994) 14(2), 110–116), in which the author describes a method of preparing colloidal aluminosilicate zeolites. The colloidal aluminosilicate zeolite particles should preferably be such that no more than 5% of the particles are of size greater than 1 μm in diameter and not more than 5% of particles are of size less then 0.05 μm in diameter. Preferably the aluminosilicate zeolite particles have an average particle size diameter of between 0.01 μm and 1 μm, more preferably between 0.05 μm and 0.9 μm, most preferably between 0.1 μm and 0.6 μm.

Zeolite A has the formula:

$$Na_{12}[AlO_2)_{12}(SiO_2)_{12}] \cdot xH_2O$$

wherein x is from 20 to 30, especially 27. Zeolite X has the formula $Na_{86}[(AlO_2)_{86}(SiO_2)_{106}] \cdot 276\ H_2O$. Zeolite MAP, as disclosed in EP-B-384,070 is a preferred zeolite builder for use herein.

Preferred aluminosilicate zeolites are the colloidal aluminosilicate zeolites. When employed as a component of scrubbing liquor composition colloidal aluminosilicate zeolites, especially hydrophobic zeolite ZSM5 provide enhanced VOC adsorption and subsequently fast indoor odor removal. Hydrophilic zeolites can be similarly effective when dispersed in a hydrophobic water-free organic scrubbing liquor.

Other example of suitable solid sorbent is activated carbons. Virtually any type of activated carbon can be suitable to be used in the present invention. Examples include: coconut activated carbon, wood activated carbon, bituminous coal activated carbon.

Examples of physical form of the enlisted solid sorbents are: particles, nanoparticles, crystals, powder, granules, pellets, and generally every possible shape and size.

Preferably, the solid sorbents have a largest dimension with a size ranging from about 1 nm to about 4 mm.

Solid sorbents can be incorporated in the air purification device in different ways, among which: a filter medium in a removable or fixed casing along the scrubbing liquor recirculation loop, a filter medium in a removable or fixed casing in the scrubbing column, a filter medium in a removable or fixed casing in the scrubbing liquor reservoir, a suspension of particles in the scrubbing liquor, a dispersion of particles in the scrubbing column packing material.

When a filter casing is used, solid sorbents can be tightly packed within a container, agglomerated within a form by use of any of a number of binders, extruded, or formed to provide a self-supporting unit.

Others

Other components conventionally used in scrubbing liquor compositions may be employed, such as acidic agents, alkaline agents, pollution-suspending agents, bactericides, tarnish inhibitors, coloring agents, and/or encapsulated or non-encapsulated perfumes.

Virtually any acidic or alkaline agent can be utilised to control the pH of the scrubbing liquor used in the present invention. A preferred pH range suitable for the best performance of the scrubbing liquor is between about 1 and about 14. A more preferred range is between about 5 and about 14, and an even more preferred range is between about 6 and about 14.

Especially suitable encapsulating materials are water soluble capsules which consist of a matrix of polysaccharide and polyhydroxy compounds such as described in GB 1,464,616. Other suitable water soluble encapsulating materials comprise dextrins derived from ungelatinized starch acid-esters of substituted dicarboxylic acids such as described in U.S. Pat. No. 3,455,838. These acid-ester dextrins are, preferably, prepared from such starches as waxy maize, waxy sorghum, sago, tapioca and potato. Suitable examples of encapsulating materials include N-Lok manufactured by National Starch. The N-Lok encapsulating material consists of a modified maize starch and glucose. The starch is modified by adding monofunctional substituted groups such as octenyl succinic acid anhydride.

Pollution suspension agents suitable for use herein include cellulose derivatives such as methylcellulose, carboxymethylcellulose and hydroxyethylcellulose, and homo- or co-polymeric polycarboxylic acids or their salts. Polymers of this type include the polyacrylates and maleic anhydride-acrylic acid copolymers previously mentioned as sequestrants, as well as copolymers of maleic anhydride with ethylene, methylvinyl ether or methacrylic acid, the maleic anhydride constituting at least 20 mole percent of the copolymer. Such components may be included in any suitable amount. These materials are normally used at levels of from 0.5% to 10% by weight, more preferably from 0.75% to 8%, most preferably from 1% to 6% by weight of the scrubbing liquor.

Other useful polymeric materials are the polyethylene glycols, particularly those of molecular weight 1,000–10,000, more particularly 2,000 to 8,000 and most preferably about 4,000. Such components may be included in any suitable amount. These can be used at levels of from about 0.20% to about 5% more preferably from about 0.25% to about 2.5% by weight. These polymers and the previously mentioned homo- or co-polymeric polycarboxylate salts are valuable for absorption and dispersion of absorbed pollution.

EXAMPLES

The following are several non-limiting examples of scrubbing liquor formulations:

| A scrubbing liquor composition comprising the following: (% are expressed by weight) | |
|---|---|
| Example n.1: | |
| Potassium Phosphate | 35% |
| Potassium Biphosphate | 30% |
| Activated Carbon type F200 | |
| (from Calgon Carbon Corporation, Pittsburgh, PA) | |
| 50 microns particle size | 2% |
| Zeolite type ZSM5 | |
| (from various companies, e.g. Degussa-Huls AG of Frankfurt, Germany and Ridgefield Park, N.J. USA) | |
| 10 microns particle size | 8% |
| demineralised water | balance to 100% |
| Example n.2: | |
| PolyEthyleneGlycol 300 | 60% |
| Dobanol A3S | 15% |
| (from Shell Chemicals Ltd., Amesterdam, Netherlands) | |
| Squalane | 20% |
| Zeolite type ZSM5 | |
| (from various companies, eg Degussa) | |
| 10 microns particle size | 6% |
| Hydrogen peroxide | 3% |
| demineralised water | balance to 100% |
| Example n.3: | |
| Potassium Carbonate | 50% |
| Potassium Bicarbonate | 5% |
| Activated Carbon type F200 | |
| (from Calgon Corp.) | |
| 50 microns particle size | 2% |
| Zeolite type ZSM5 | |
| (from various companies, eg Degussa) | |
| 10 microns particle size | 8% |
| demineralised water | balance to 100% |
| Example n.4: | |
| Calcium Chloride | 40% |
| Marlipal (surfactant) | 5% |
| Zeolite ABS1000 | 10% |
| (from United Oil Products, LLC, Des Plaines, IL, USA) | |
| Squalane | 2% |
| Laponite (from Southern Clay Products, Inc., Gonzales, Texas, USA) | 0.1% |
| Demineralized water | balance to 100% |
| Example n.5: | |
| Marlipal (surfactant) | 10% |
| Squalane | 5% |
| PolyEthyleneGlycol 300 | 20% |
| Activated carbon type F200 | |
| (from Calgon Corp.) | |
| 50 microns particle size | 12% |
| Zeolite Y | 2% |
| (from EKA Chemicals, Bohus, Sweden) | |
| Laponite | 0.1% |
| demineralised water | balance to 100% |

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the present invention have been illustrated and described, it would be obvious to those skilled in the art that various other changes and modifications can be made without departing from the spirit and scope of the present invention. The foregoing and other modifications of the preferred embodiment as well as other embodiments of the invention will be obvious or suggested to those skilled in the art, whereby it is to be distinctly understood that the foregoing descriptive matter is to be interpreted merely as illustrative of the invention and not as a limitation. The scope of the invention is set out in the appended claims.

What is claimed is:

1. A stand-alone indoor air cleaning apparatus comprising:
   a. an inlet for ambient air;
   b. an outlet for purified air;
   c. a means for the uptake of a scrubbing liquor and for the removal of impurities dissolved or dispersed in the ambient air by contact with said scrubbing liquor, wherein said scrubbing liquor comprises a non-evaporative liquid that is able to remove at least some volatile organic compounds and gaseous pollutants from ambient air containing such pollutants;
   d. an inlet for feeding a scrubbing liquor from a scrubbing liquor feeding tank;
   e. an outlet for discharging used scrubbing liquor; and
   f. a blower for drawing ambient air into the apparatus, flowing the air through the apparatus and discharging the purified air from the apparatus.

2. The apparatus according to claim 1 further comprising an inlet filter located before the uptake and removal means, to remove particles contained in the ambient air.

3. The apparatus according to claim 1 further comprising an outlet filter immediately before the outlet for purified air to remove a majority of particles in the air stream of the apparatus.

4. The apparatus according to claim 3 wherein the outlet filter is a mechanical filter of HEPA, ULPA or electrect type, optionally combined with an activated carbon, zeolite or other adsorbent filter.

5. The apparatus according to claim 3 wherein the outlet filter is an electrostatic precipitator device, optionally followed by a means for trapping ozone contained in the filtered air.

6. The apparatus according to claim 1 further comprising a means for recirculating the scrubbing liquor through the uptake and removal means.

7. The apparatus according to claim 6 further comprising a radiation device to irradiate the scrubbing liquor during its recirculation.

8. The apparatus according to claim 4 further comprising a filter to remove absorbed gaseous pollutants and solid matter in the scrubbing liquor before it is recirculated to the uptake and removal means.

9. The apparatus according to claim 1 further comprising an ionizer for treating the purified air, optionally followed by a means for trapping ozone contained in the purified air.

10. The apparatus of claim 1 further comprising:
   g. a depletion sensor to determine the exhaustion degree of the scrubbing liquor;
   h. a display control board and a microprocessor controller to allow control or modification of apparatus operating conditions; and
   i. a sensor means to determine air conditions.

11. The apparatus according to claim 10 wherein the depletion sensor is a turbidity sensor and/or a pH sensor.

12. The apparatus according to claim 10 wherein the sensor means to determine air conditions is a relative humidity, temperature, VOC's, odor and/or dust sensor.

13. The apparatus according to claim 1 wherein the uptake and removal means is a scrubber which generates a spray of fine droplets of the scrubbing liquor for contact with the incoming ambient air.

14. The apparatus according to claim 1 wherein the uptake and removal means is a bubbling vessel containing the scrubbing liquor through whit the incoming ambient air is bubbled.

15. The apparatus according to claim 1 wherein the uptake and removal means is a column filled with fillers or porous elements that allow percolation of the scrubbing liquor.

16. The apparatus according to claim 1 further comprising means for separately feeding a liquid solvent and scrubbing liquor ingredients and optionally further additives, and means for preparing the scrubbing liquor therefrom within or upstream the scrubbing liquor feeding tank.

17. The apparatus according to claim 1 further comprising means for adding air enhancers to the purified air.

18. The apparatus according to claim 1 further comprising a line for bypassing ambient air around the uptake and removal means.

19. The apparatus according to claim 1 further comprising a device for controlling water vapor emission.

20. The apparatus according to claim 6 further comprising a means to photo-oxidize the scrubbing liquor during its recirculation.

21. The apparatus according to claim 1 wherein the air stream passes through a photo-oxidation device.

22. The apparatus according to claim 1 wherein the scrubbing liquor contains aqueous or essentially non aqueous solvent and further additives selected from the group consisting of: acidic or alkaline agents, surfactants, enzymes, bleaching agents, metal containing bleach catalysts, organic polymeric compounds, seqestration systems, chelating agents, inclusion complexes, suds suppressors, dispersant, desiccant compounds, solid sorbents, photobleaching agents, coloring agents, perfumes, sanitizers, biocidals, antibacterial agents and antimicrobial agents.

23. The apparatus according to claim 1 wherein the scrubbing liquor is an aqueous scrubbing liquor comprising water as the main liquid solvent.

24. The apparatus according to claim 1 wherein the scrubbing liquor is a liquid comprising any polyethylene glycols as the main liquid solvent.

25. The apparatus according to claim 1 wherein the scrubbing liquor is a liquid that is non-evaporative.

26. The apparatus according to claim 1 further comprising a dehumidifier before the outlet for the purified air.

27. The apparatus according to claim 1 wherein the scrubbing liquor is a liquid comprising active solid particles.

28. A kit comprising an apparatus according to claim 1 and a refill of scrubbing liquor ingredients, or a refill of a scrubbing liquor concentrate, or a refill of a ready-to-use scrubbing liquor.

* * * * *